United States Patent
Kim et al.

(10) Patent No.: US 11,076,097 B2
(45) Date of Patent: Jul. 27, 2021

(54) METHOD FOR STREET VIEW SERVICE AND APPARATUS FOR PERFORMING SAME METHOD

(71) Applicant: LINKFLOW CO., LTD, Seoul (KR)

(72) Inventors: Yong Kuk Kim, Gyeonggi-do (KR); Sung Rae Cho, Seoul (KR); Yong Jin Kim, Seoul (KR); Jun Se Kim, Gyeonggi-do (KR)

(73) Assignee: Linkflow Co., Ltd., Seoul (KR)

( * ) Notice: Subject to any disclaimer, the term of this patent is extended or adjusted under 35 U.S.C. 154(b) by 0 days.

(21) Appl. No.: 16/640,890

(22) PCT Filed: Dec. 12, 2017

(86) PCT No.: PCT/KR2017/014517
§ 371 (c)(1),
(2) Date: Feb. 21, 2020

(87) PCT Pub. No.: WO2019/039668
PCT Pub. Date: Feb. 28, 2019

(65) Prior Publication Data
US 2020/0195844 A1    Jun. 18, 2020

(30) Foreign Application Priority Data
Aug. 23, 2017  (KR) .......................... 10-2017-0106398

(51) Int. Cl.
*H04N 13/167*   (2018.01)
*H04N 13/117*   (2018.01)
(Continued)

(52) U.S. Cl.
CPC ......... *H04N 5/23238* (2013.01); *H04N 5/247* (2013.01); *H04N 13/117* (2018.05); *H04N 13/167* (2018.05)

(58) Field of Classification Search
CPC .................................................. H04N 5/23238
See application file for complete search history.

(56) References Cited

U.S. PATENT DOCUMENTS

| 5,534,221 A | * | 7/1996 | Hillebrenner | .......... A61B 1/125 206/438 |
| 5,868,664 A | * | 2/1999 | Speier | .................... A61B 1/042 348/73 |

(Continued)

FOREIGN PATENT DOCUMENTS

| JP | 2008243185 A | 10/2008 |
| JP | 2016110639 A | 6/2016 |

(Continued)

OTHER PUBLICATIONS

International Search Report for PCT/KR2017/014517 dated Jul. 4, 2018.
(Continued)

*Primary Examiner* — Irfan Habib
(74) *Attorney, Agent, or Firm* — Mark T. Vogelbacker; Eckert Seamans Cherin & Mellott, LLC

(57) ABSTRACT

The present invention relates to a method for a street view service and an apparatus for performing same method. The method for a street view service may comprise: a step in which a street view service server receives a first path image for a first path from a first image processing apparatus; a step in which the street view service server generates first user provision information for the street view service for the first path on the basis of the first path image; and a step in which the street view service server transmits the first user provision information to a user apparatus.

7 Claims, 17 Drawing Sheets

(51) Int. Cl.
*H04N 5/232* (2006.01)
*H04N 5/247* (2006.01)

(56) References Cited

U.S. PATENT DOCUMENTS

| | | | | |
|---|---|---|---|---|
| 7,720,596 | B2* | 5/2010 | Kobuya | H04N 21/41407 701/426 |
| 8,034,193 | B2* | 10/2011 | Suzuki | A61B 90/70 134/166 C |
| 8,035,617 | B2* | 10/2011 | Penna | G06F 3/0481 345/169 |
| 8,176,771 | B2* | 5/2012 | Onishi | A61B 1/00057 73/45.5 |
| 8,554,871 | B2* | 10/2013 | Samsalovic | G06F 16/258 709/217 |
| 8,913,083 | B1 | 12/2014 | Ogale et al. | |
| 8,924,149 | B2* | 12/2014 | Coppens | G01C 21/32 701/438 |
| 8,972,714 | B2* | 3/2015 | Talbert | H04N 7/183 713/150 |
| 9,080,893 | B2* | 7/2015 | Chang | G01C 21/3623 |
| 9,089,255 | B2* | 7/2015 | Kato | A61B 1/00124 |
| 9,277,850 | B2* | 3/2016 | Kubach | G01M 3/26 |
| 9,936,859 | B2* | 4/2018 | Ebata | A61B 17/00234 |
| 10,350,318 | B2 | 7/2019 | Sharma | A61B 1/125 |
| 10,419,670 | B2* | 9/2019 | Kim | H04N 5/23238 |
| 2001/0033806 | A1* | 10/2001 | Stanley | A61B 1/123 422/28 |
| 2003/0133008 | A1* | 7/2003 | Stephenson | H04N 5/232 348/47 |
| 2005/0065402 | A1* | 3/2005 | Moriyama | A61L 2/07 600/133 |
| 2005/0148819 | A1* | 7/2005 | Noguchi | A61B 1/00059 600/133 |
| 2006/0263245 | A1* | 11/2006 | Watanabe | A61B 1/121 422/400 |
| 2010/0026512 | A1* | 2/2010 | Wang | G08C 23/04 340/12.22 |
| 2010/0191459 | A1* | 7/2010 | Carter | H04N 1/00323 701/532 |
| 2010/0305851 | A1* | 12/2010 | Meyer | G01C 21/32 701/532 |
| 2010/0313113 | A1* | 12/2010 | Chen | G06T 19/006 715/230 |
| 2011/0018709 | A1* | 1/2011 | Kornbluh | G06Q 10/08 340/539.13 |
| 2011/0066375 | A1* | 3/2011 | France | G01C 21/20 701/469 |
| 2015/0301695 | A1 | 10/2015 | Leong et al. | |
| 2016/0284048 | A1* | 9/2016 | Rekimoto | G06T 15/205 |
| 2016/0284235 | A1 | 9/2016 | Zhang | |
| 2016/0381278 | A1* | 12/2016 | Kang | A61B 1/00018 348/68 |
| 2017/0018217 | A1* | 1/2017 | Ogino | H04N 5/247 |

FOREIGN PATENT DOCUMENTS

| | | |
|---|---|---|
| KR | 10-1566543 B1 | 11/2015 |
| KR | 10-1730266 B1 | 4/2017 |
| KR | 10-2017-0050225 A | 5/2017 |
| NO | 2015122108 A1 | 8/2015 |

OTHER PUBLICATIONS

Anguelov et al., Google Street View: Capturing the World At Street Level, Published by the IEEE computer Society (2010), pp. 32-38.
Office Action Issued in Japanese Patent Application No. 2020-511264 dated March 23, 2021.

* cited by examiner

METHOD FOR STREET VIEW SERVICE AND APPARATUS FOR PERFORMING SAME METHOD

CROSS-REFERENCE TO RELATED APPLICATIONS

The present application is a 35 U.S.C. § 371 national phase application from, and claims priority to, International Application No. PCT/KR2017/014517, filed Dec. 12, 2017, and claims the benefit of priority from Korean Patent Application No. 10-2017-0106398, filed Aug. 23, 2017, each of which are incorporated by reference herein into this application in their entirety.

TECHNICAL FIELD

The present invention relates to a street view service method and an apparatus for performing the same method, and more particularly, to a method and apparatus for providing street view service on the basis of post-processing of an image generated based on a user's imaging apparatus.

BACKGROUND ART

An omnidirectional imaging system is an imaging system capable of recording image information of all directions (360 degrees) from a particular point. Since the omnidirectional imaging system can provide very wide field-of-view images, as compared to an existing imaging system, the range of applications of the omnidirectional imaging system has increasingly been broadened not only to research fields such as the fields of computer vision and mobile robots, but also to practical fields such as the fields of surveillance systems, virtual reality systems, and pan-tilt-zoom (PTZ) cameras, and video conferencing.

Various methods can be used to obtain an omnidirectional image. For example, images may be obtained by rotating one camera with respect to an optical axis that satisfies a single view point, and an omnidirectional image may be generated by combining the images. In another example, a method may be used in which a plurality of cameras are arranged into an annular structure and images obtained by the plurality of cameras are combined. A user may generate an omnidirectional image using various omnidirectional image processing apparatuses (or omnidirectional image processing cameras) for obtaining an omnidirectional image.

An omnidirectional imaging apparatus may be utilized in various fields. For example, an omnidirectional imaging apparatus may be utilized in an area requiring surveillance of an omnidirectional image such as crime prevention/security or may be utilized to record places visited by a traveler when traveling. In addition, an omnidirectional image captured based on an omnidirectional imaging apparatus may be edited and utilized as a product sales image or may be utilized as an image for providing an image-based map service such as a street view service.

Therefore, there is a need to develop a technology for a user utilizing omnidirectional images generated based on an omnidirectional image processing apparatus in various fields by processing the omnidirectional images in various ways.

DISCLOSURE

Technical Problem

An object of the present invention is to solve all the above-mentioned problems.

Also, another object of the present invention is to provide a video-based street view service on the basis of post-processing of an image (e.g., an omnidirectional image) collected by a user's image processing apparatus.

Also, another object of the present invention is to implement a street view service for providing fast image update and street views of various imaging time points through post-processing of a plurality of images generated by a plurality of image processing apparatuses of a plurality of users.

In addition, still another object of the present invention is to provide street views for various paths along which people can move (e.g., paths that vehicles cannot pass through, such as stairs, narrow alleys, etc.).

Technical Solution

Aspects of the present inventive concept are as follows.

According to an aspect of the present inventive concept, a street view service method comprises causing a street view service server to receive a first path image of a first path from a first image processing apparatus, causing the street view service server to generate first user provision information for a street view service for the first path on the basis of the first path image and causing the street view service server to transmit the first user provision information to a user apparatus.

According to another aspect of the present inventive concept, a street view service server for a street view service, the street view service server comprises a communication unit for data communication with a user apparatus and a processor operatively connected to the communication unit, wherein the processor is configured to receive a first path image of a first path from a first image processing apparatus, generate first user provision information for a street view service for the first path on the basis of the first path image and transmit the first user provision information to the user apparatus.

Advantageous Effects

According to exemplary embodiments of the present inventive concept, a video-based street view service on the basis of post-processing of an image (e.g., an omnidirectional image) collected by a user's image processing apparatus can be provided.

In addition, a street view service for providing fast image update and street views of various imaging time points through post-processing of a plurality of images generated by a plurality of image processing apparatuses of a plurality of users can be implemented.

In addition, street views for various paths along which people can move (e.g., paths that vehicles cannot pass through, such as stairs, narrow alleys, etc.) can be provided.

MODES OF THE INVENTION

Figure 1:
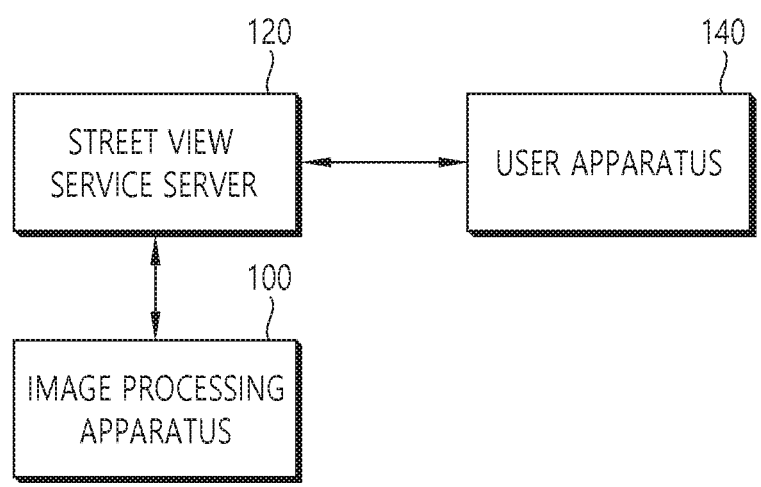
FIG. 1 is a conceptual diagram showing a street view service provision system according to an embodiment of the present invention.

In the following detailed description of the present inventive concept, references are made to the accompanying drawings that show, by way of illustration, specific embodiments in which the present inventive concept may be practiced. These embodiments are described in sufficient detail to enable those skilled in the art to practice the present inventive concept. It is to be understood that the various embodiments of the present inventive concept, although different from each other, are not necessarily mutually exclusive. For example, specific shapes, structures and characteristics described herein may be implemented as modified from one embodiment to another without departing from the spirit and scope of the present inventive concept. Furthermore, it shall be understood that the locations or arrangements of individual components within each embodiment may also be modified without departing from the spirit and scope of the present inventive concept. Therefore, the following detailed description is not to be taken in a limiting sense, and the scope of the present inventive concept is to be taken as encompassing the scope of the appended claims and all equivalents thereof. In the drawings, like reference numerals refer to the same or similar elements throughout the several views.

Hereinafter, preferred embodiments of the present inventive concept will be described in detail with reference to the accompanying drawings to enable those skilled in the art to easily implement the present inventive concept.

Hereinafter, an image processing apparatus according to an embodiment of the present invention may include an omnidirectional image processing apparatus. The omnidirectional image processing apparatus may include an omnidirectional camera (a 360-degree camera) capable of capturing an omnidirectional image (or a 360-degree image). In addition, the image processing apparatus may be an apparatus capable of capturing a specific-angle-of-view image rather than an omnidirectional image.

Hereinafter, also, image information and video information disclosed in an embodiment of the present invention may include an omnidirectional image (or a 365-degree image) and may include a specific-angle-of-view image in addition to an omnidirectional image.

Hereinafter, in the embodiment of the present invention, for convenience of description, the image-based service may be a street view service. The street view service is a service for providing image information regarding a movement path and a road periphery. A user may receive image information regarding a path to which he or she has never been. Also, the street view may be interpreted as including not only image information regarding the movement path and the road periphery but also an image of a building interior to which he or she can move along the movement path (e.g., a shopping mall, a coffee shop, or the like).

FIG. 1 is a conceptual diagram showing a street view service provision system according to an embodiment of the present invention.

In FIG. 1, there is disclosed a street view service provision system for providing a street view service on the basis of an image captured by an image processing apparatus.

The street view service provision system may include an image processing apparatus 100, a street view service server 120, and a user apparatus 140.

The image processing apparatus 100 may be implemented to generate a path image for providing the street view service. The image processing apparatus 100 may be implemented to generate an image of a path (e.g., an omnidirectional image regarding a path and a path periphery). For example, the image processing apparatus 100 may move along a path and image the path and the periphery of the path to generate a path image. Hereinafter, the path image may be an omnidirectional image or a set of omnidirectional images that are captured at a specific location on the path by the image processing apparatus 100.

The image processing apparatus 100 may generate the path image while moving along the path. The image processing apparatus 100 may detect a current imaging location where the path image is generated and may generate current imaging location information. For example, the image processing apparatus 100 may include location information generation module (e.g., a global positioning system (GPS) module) for detecting the current imaging location information and generating imaging location information. The location information generation module may detect the current imaging location of the image processing apparatus 100 and generate the imaging location information. The imaging location information may be matched to or included in information regarding the path image. Thus, the imaging location information and the information regarding the path image may be generated as a single information unit.

Therefore, image post-processing may be performed on the path image in consideration of the imaging location information during a subsequent image post-processing process. Through the image post-processing for the path image, a street view may be provided to users. An image for providing a street view service to a user on the basis of image post-processing for the path image may be expressed using the term "user provision image."

According to an embodiment of the present invention, the imaging location information may correspond to at least one of a plurality of frames included in the path image generated by the image processing apparatus 100. The image processing apparatus 100 may generate a plurality of frames per time unit, and the imaging location information may correspond to at least one of the plurality of frames. The correspondence between the imaging location information and the frames included in the path image may be directly performed by the image processing apparatus 100 or may be performed by the street view service server 120. The correspondence between the imaging location information and the frame and the post-processing of the path image generated by the image processing apparatus 100 will be described below.

The street view service server 120 may provide a street view service to the user apparatus 140 on the basis of the imaging location information and the information regarding the path image received from the image processing apparatus 100.

The street view service may be a service that provides an actual image captured along a specific path on a map through the user apparatus 140 of the user. Conventionally, a street view service has been provided based on still images. However, an omnidirectional image based on a video captured along a specific path may be provided in the street view service according to an embodiment of the present invention.

User provision information provided to the user apparatus 140 by the street view service may include user provision image information, control information for providing the street view service according to user input information through the user apparatus 140, etc. The user provision image information is an image generated through post-processing of a path image captured by the image processing apparatus 100 and may include post-processed street view image information for providing the street view service to the user apparatus 140.

For example, the street view service server 120 may generate the user provision information for providing the street view service to the user apparatus 140 through the post-processing of the path image received from the image processing apparatus 100. The user provision information may include the user provision image information and the control information (e.g., movement control information, detection-related information, etc.) for controlling the street view service according to the user's input information through the user apparatus 140.

The street view service server 120 may exclude redundant or unnecessary portions from the path image received from the image processing apparatus 100 on the basis of the imaging location information corresponding to the frame. Also, the street view service server 120 may generate the user provision image information through divisional image processing for a path image for each movement path.

For example, the street view service server 120 may generate the user provision image by excluding a redundantly captured portion from an image generated by the image processing apparatus 100. Whether an image is redundantly captured may be determined based on the imaging location information corresponding to the frame.

Also, the street view service server 120 may divide the path image on a path basis in consideration of the imaging location information regarding where the path image is captured and may generate a path-specific user provision image. For example, when the path is divided into a first path and a second path at a branch point, a user provision image for the first path may be generated based on a first path image for the first path, and a user provision image for the second path may be generated based on a second path image for the second path.

Also, the street view service server 120 may generate control information for a user's virtual movement on the user provision image.

For example, when a user receives the street view service, the user provision image (or the street view image) may be provided through the user apparatus 140, and the user provision image may be changed according to user input information. Thus, visual sensations may be provided to make the user feel as if he or she is actually moving along the path. The street view service server 120 may determine a path existing in the user provision image and may generate control information for outputting a user interface (movement) to the path.

As another example, the street view service server 120 may determine a path existing in the user provision image and may generate control information for outputting a user interface (movement) to the branch point.

Also, the street view service server 120 may generate control information for matching the user provision image in consideration of information that is input through the user interface (movement). For example, the street view service server 120 may display the user interface (movement) at a branch point in the user provision image, receive user input information through the user interface (movement), and generate control information for providing a user provision image to a user according to the user input information. The control information may be information for providing a user provision image corresponding to a movement direction indicated by the user input information. A user provision image for the movement direction indicated through the user apparatus 140 may be provided on the basis of the control information, and the user may virtually move along the path.

The street view service server 120 may provide the user provision image and/or the control information to the user apparatus 140 at once, and the street view service may be performed through the user apparatus 140 according to the user provision image information and the control information.

The street view service server 120 may receive user provision image request information from the user apparatus 140 and may provide, to the user apparatus 140, a requested user provision image and/or control information for providing the street view service on the basis of the requested user provision image. The user provision image request information may be generated based on the user input information that is input through the user interface. Alternatively, the street view service server 120 may receive the user input information from the user apparatus 140 through the user interface (movement) and may provide a user provision image which may be requested of the user within a certain time on the basis of the user input information. For example, the street view service server 120 may provide, to the user apparatus 140, a user provision image corresponding to a threshold movement distance from the user's current location. Alternatively, when the user apparatus 140 moves in only a first direction through the user interface (movement), the user provision image corresponding to the threshold movement distance in the first direction may be provided to the user apparatus 140.

The street view service server 120 may include a communication unit for data communication with the image processing apparatus 100 and the user apparatus 140 and may include a processor operatively connected to the communication unit. Hereinafter, the operation of the street view service server 120 disclosed in an embodiment of the present invention may be performed on the basis of a processor.

The user apparatus 140 may receive the user provision information from the street view service server 120 and provide the street view service to the user. As described above, the user provision information may include the user provision image information and the control information.

For example, the user apparatus 140 may output the user provision image on the basis of the user provision information. Also, the user interface (movement) may be output onto the user provision image provided through the user apparatus 140 on the basis of the control information, and the user provision image provided through the user apparatus 140 may be changed based on information that is input through the user interface (movement).

For example, the user apparatus 140 may be an apparatus capable of outputting an omnidirectional virtual reality (VR)/augmented reality (AR)-based street view image and recognizing a user's motion. The user apparatus 140 may be a head-mounted display (HMD) and may interpret and receive a user's hand motion as the user input information. Alternatively, the user apparatus 140 may be an apparatus such as a smartphone and a personal computer (PC) and may receive a touch/key-based user input signal and output a street view image.

In detail, the user may select a direction to move through the user interface (movement) on the user provision image provided through the user apparatus 140 and may move virtually along the path. For example, the user provision image may output the user interface (movement) at the branch point. An icon (or an image) which indicates a direction to move and which is included in the user interface (movement) may be selected by the user's hand. The user apparatus 140 may recognize the hand motion as the user input information, and a user provision image corresponding to the user input information may be provided to the user.

Alternatively, the user apparatus 140 may recognize a motion of another body part of the user as the user input information, and a user provision image corresponding to a specific direction selected by the user on the basis of the movement control information may be provided to the user through the user apparatus 140.

The image processing apparatus may be an apparatus capable of generating omnidirectional video information, and the street view service server according to an embodiment of the present invention may provide a video-based street view service for providing fast image update and street views of various imaging time points through post-processing of a plurality of images generated by a plurality of image processing apparatuses of a plurality of users.

In addition, the image processing apparatus according to an embodiment of the present invention is a wearable apparatus and may image street views for various paths along which people wearing the image processing apparatus can move (e.g., paths that vehicles cannot pass through, such as stairs, narrow alleys, etc.). That is, unlike a conventional method of providing a street view service based on an image collected through a vehicle, a street view service may be provided on a path along which people can move.

Figure 2:
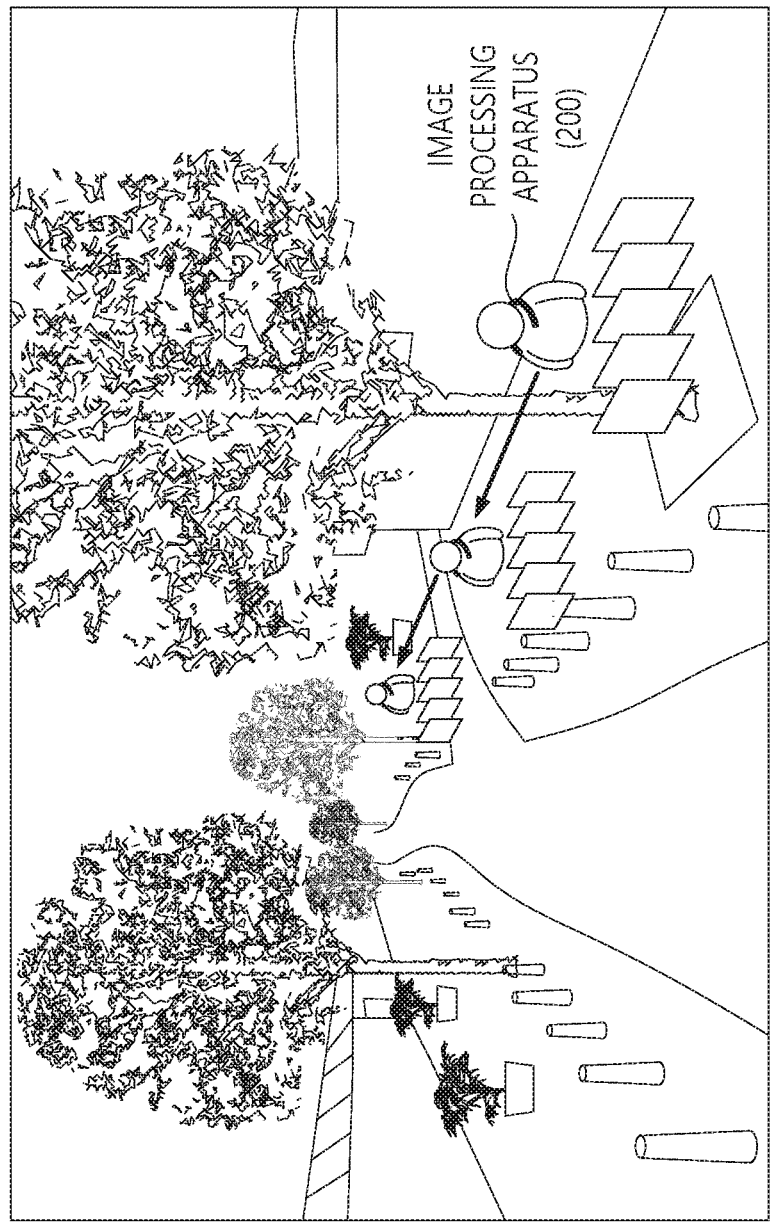
FIG. 2 is a conceptual diagram showing an image processing method of an image processing apparatus according to an embodiment of the present invention.

FIG. 2 is a conceptual diagram showing an image processing method of an image processing apparatus according to an embodiment of the present invention.

In FIG. 2, there is disclosed a method of determining imaging location information corresponding to a plurality of frames (or pictures) included in information (or video information, omnidirectional image information, 360-degree image information) regarding a path image generated by an image processing apparatus 200 (or image information).

The image processing apparatus 200 may image a plurality of frames in a specific time unit (e.g., one second) and generate information regarding a path image. For example, the image processing apparatus 200 may image a plurality of frames in a certain time (e.g., seconds) such as 60 frames per second (fps), 30 fps, and 24 fps and generate information regarding a path image.

According to an embodiment of the present invention, as information corresponding to at least one of a plurality of frames, imaging location information (or geotag information) regarding a location where the frame is imaged may be determined. That is, the imaging location information may be generated as information corresponding to all or a predetermined frame generated by the image processing apparatus 200.

The image processing apparatus 200 may capture a path image indoors or outdoors. The image processing apparatus 200 (or a separate external apparatus) may acquire imaging location information indoors or outdoors, and the acquired imaging location information may correspond to at least one of a plurality of frames included in the path image.

The imaging location information is frame parameter information and may be processed by the street view service server while being included in a transmission unit (or a transmission format) of the information regarding the path image (a video bitstream). The imaging location information may be included as the frame parameter information and may be transmitted along with the information regarding the path image including frame information. In detail, a first information unit for the imaging location information and a second information unit including the frame information may constitute one video bitstream.

Alternatively, the imaging location information may be generated by a separate external apparatus and transmitted directly to the street view service server and may be combined with a plurality of pieces of frame information constituting the information regarding the path image transmitted by the image processing apparatus 200 in the street view service server.

Alternatively, the imaging location information may be generated in an individual information format (or transmission unit) separated from the information regarding the path image. For example, the imaging location information may be generated in a separate information format according to frame imaging time information, and the information regarding the path image may include the frame information and frame imaging time information corresponding to frames. The imaging location information may include (time information and imaging location information), and the information regarding the path image may include (time information and frame information). The imaging location information may be matched to the frame information on the basis of synchronized time information, and the imaging location information regarding where the frame is imaged may be acquired.

Figure 3:
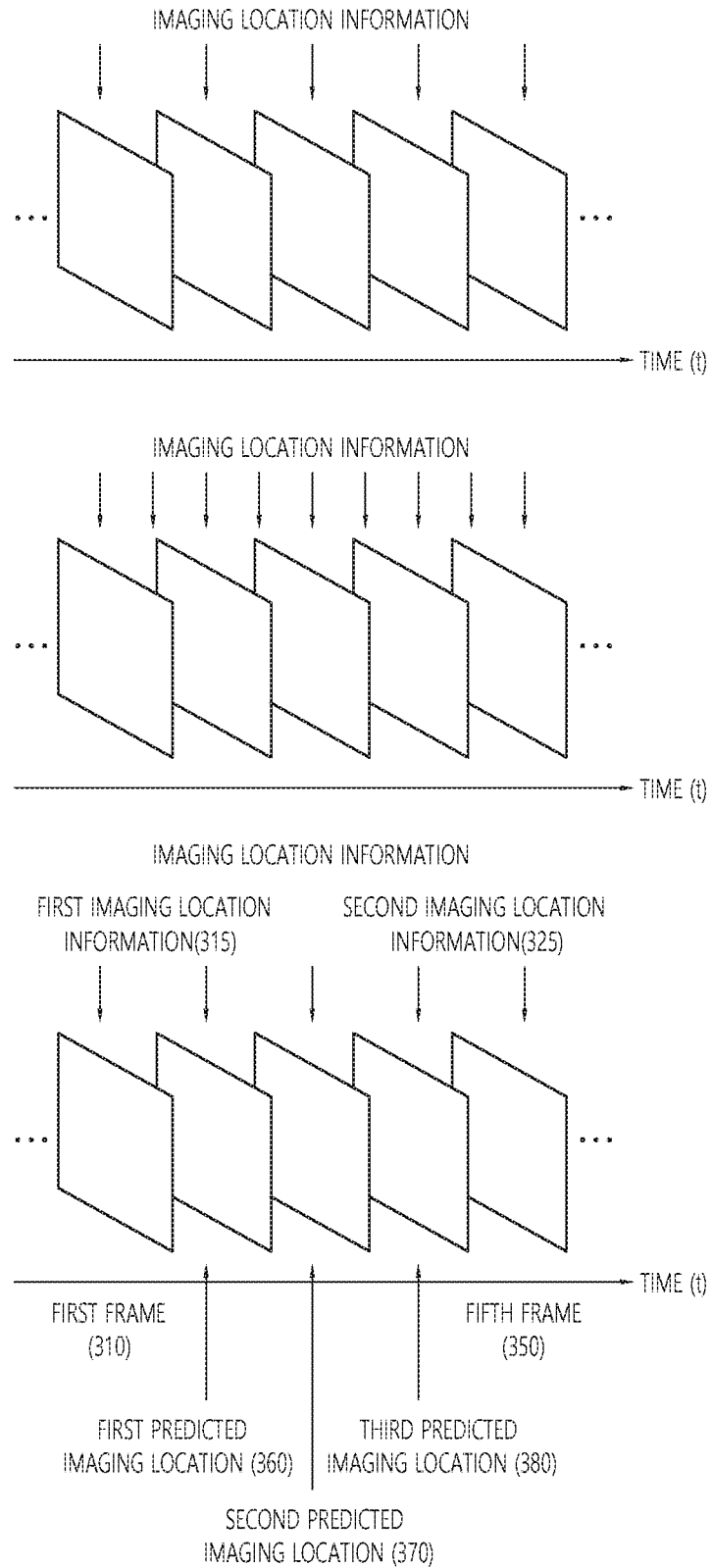
FIG. 3 is a conceptual diagram showing a frame group according to an embodiment of the present invention.

FIG. 3 is a conceptual diagram showing a frame group according to an embodiment of the present invention.

In FIG. 3, there is disclosed a frame group including a plurality of frames. The frame group may be a set including a plurality of frames. FIG. 3 assumes that the imaging location information corresponding to the plurality of frames included in the frame group is generated.

The imaging location information corresponding to the plurality of frames included in the frame group may be generated. The imaging location information may be information regarding an imaging location where the frame is imaged. The imaging location information may be generated by the image processing apparatus and may be generated by a separate external apparatus.

Referring to the upper part of FIG. 3, the imaging location information for the plurality of frames may be generated by matching the number of pieces of imaging location information to the number of frames per second (e.g., 30 fps) on the same time resource. For example, the imaging location information may be detected and generated at 30 intervals per second, and the imaging location information may correspond to a plurality of frames generated at 30 fps.

Referring to the middle part of FIG. 3, when the number of pieces of imaging location information is greater than the number of frames per second on the same time resource, some of the imaging location information may be ignored, and corresponding imaging location information that is temporarily closest to a frame may be determined as imaging location information of the corresponding frame. For example, when first imaging location information generated at 1/30 seconds and second imaging location information generated at 1/25 seconds exist, imaging location information for a frame generated at 1/30 seconds may be the first imaging location information.

Referring to the lower part of FIG. 3, when the number of pieces of imaging location information is smaller than the number of frames per second on the same time resource, predicted imaging location information may be determined based on the imaging location information and may be determined as imaging location information for frames.

For example, imaging location information received when a first frame 310 is imaged may be first imaging location information 315, and imaging location information received when a fifth frame 350 is subsequently imaged may be second imaging location information 325.

Imaging location information for a second frame, a third frame, and a fourth frame imaged between the first frame 310 and the fifth frame 350 may be determined as the first imaging location information 315 and may be determined based on the first imaging location information 315 and the second imaging location information 325. A user movement path may be set by straightly connecting a first location indicated by the first imaging location information 315 and a second location indicated by the second imaging location information 325 or in consideration of path information on a map or the like.

The user movement path between the first location and the second location is divided, and a first predicted imaging location 360, a second predicted imaging location 370, and a third predicted imaging location 380 obtained through the division may be determined as imaging location information for the second frame, imaging location information for the third frame, and imaging location information for the fourth frame, respectively. For example, the user movement path between the first location and the second location is divided at equal intervals, and the first predicted imaging location 360, the second predicted imaging location 370, and the third predicted imaging location 380 may be determined due to the division of the user movement path at equal intervals.

Considering the movement speed of the image processing apparatus, the user movement path between the first location and the second location may not be divided at equal intervals.

The first predicted imaging location 360 may be determined as the imaging location information for the second frame. The second predicted imaging location 370 may be determined as the imaging location information for the third frame. The third predicted imaging location 380 may be determined as the imaging location information for the fourth frame.

The street view service server may receive the imaging location information and the frame information and generate a user provision image on the basis of the imaging location information and the frame information.

Figure 4:
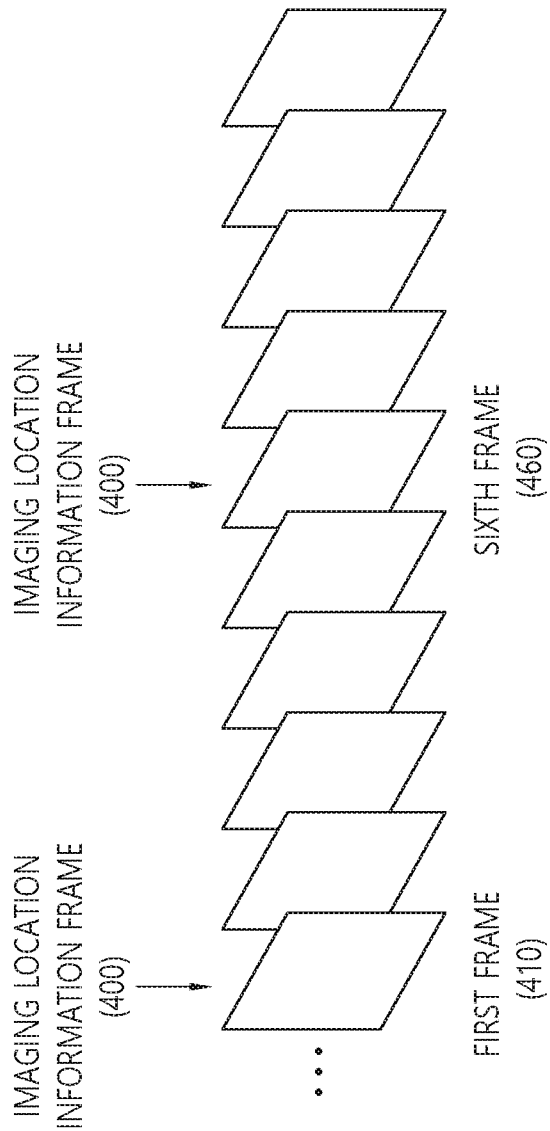
FIG. 4 is a conceptual diagram showing a frame group according to an embodiment of the present invention.

FIG. 4 is a conceptual diagram showing a frame group according to an embodiment of the present invention.

In FIG. 4, there is disclosed a frame group including a plurality of frames. The frame group may be a set including a plurality of frames. FIG. 4 assumes that imaging location information corresponds to only some of the plurality of frames included in the frame group.

Referring to FIG. 4, when imaging location information corresponding to only some of the plurality of frames exists, each of the frames corresponding to the existing location information may be expressed using the term "imaging location information frame 400."

For example, when the image processing apparatus has 30 fps and imaging location information is generated twice in one second, two of thirty frames generated in one second may be imaging location information frames 400, and the two pieces of imaging location information may correspond to the two imaging location information frames 400.

The imaging location information frames 400 may be indicated from among the plurality of frames. The service server may acquire imaging location information on the basis of indication information for the imaging location information frame 400 and generate a user provision image.

Alternatively, the image processing apparatus may preset some of the plurality of frames included in the frame group as the imaging location information frames 400. For example, when ten frames (first to tenth frames) are included in the frame group, a first frame 410 and a sixth frame 460 among the ten frames may be set as the imaging location information frames 400. The imaging location information frames 400 may be indicated from among the plurality of frames. The service server may generate imaging location information on the basis of the indication information for the imaging location information frames 400 and may generate a user provision image on the basis of the remaining frames not corresponding to the imaging location information and the imaging location information frames 400. In detail, an imaging location information frame may be determined on the basis of indication information for an imaging location information frame in order to generate a user provision image, and the user provision image may be generated through image post-processing on the basis of imaging location information corresponding to the imaging location information frame.

Figure 5:
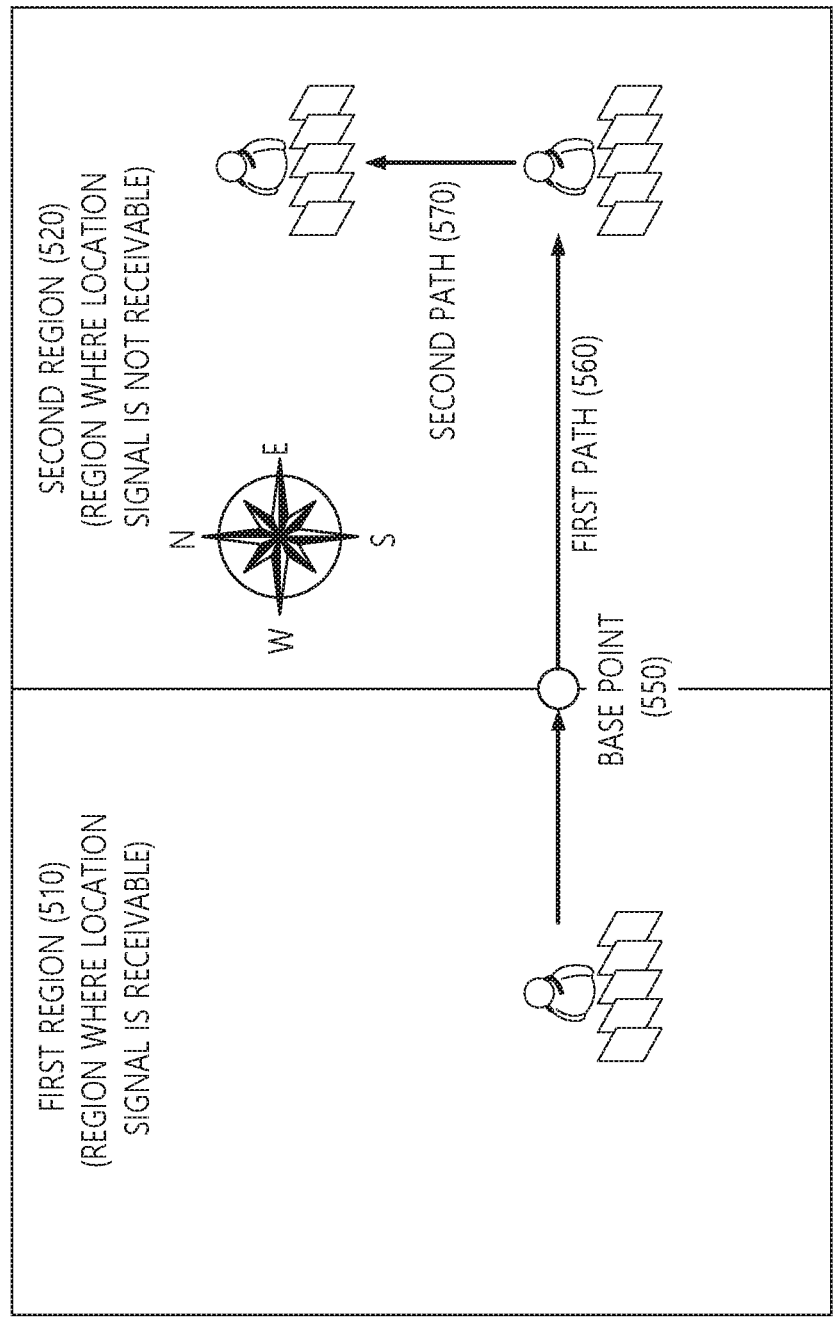
FIG. 5 is a conceptual diagram showing an imaging location information determination method according to an embodiment of the present invention.

FIG. 5 is a conceptual diagram showing an imaging location information determination method according to an embodiment of the present invention.

In FIG. 5, there is disclosed a method of determining imaging location information of an image processing apparatus that captures images.

Referring to FIG. 5, the image processing apparatus may include a positioning module, such as a GPS apparatus, and current imaging location information may be generated based on the positioning module, such as a GPS apparatus.

When the positioning module accurately receives a location signal (e.g., a GPS signal), the image processing apparatus may receive the location signal and confirm current imaging location information on the basis of the location signal.

Also, according to an embodiment of the present invention, when it is not possible to confirm the current location information on the basis of the positioning module, movement information of the image processing apparatus (or a user) may be considered in order to generate the imaging location information.

The movement information may include information associated with the movement of the image processing apparatus, such as a time-dependent movement distance, a total movement distance, a movement speed/direction, and a movement time.

When the reception of the location signal (or the GPS signal) by the image processing apparatus is interrupted, the imaging location information may be determined in consideration of the movement information.

For example, a first region 510 may be a region where location signals can be received, and a second region 520 may be a region where location signals cannot be received. When the image processing apparatus moves from the first region 510 to the second region 520, it may not be possible to receive location signals. The movement information may be generated in the second region 520 where location signal cannot be received, and imaging location information may be determined according to the movement information.

When it is not possible to receive location signals for a threshold time, the image processing apparatus may generate the movement information. When it is assumed that an operation mode for determining the imaging location information on the basis of the location signals is a first mode and an operation mode for determining the imaging location information on the basis of the movement information is a second mode, the image processing apparatus may switch the operation mode from the first mode to the second mode to determine the imaging location information.

For example, it may be assumed that a user wearing the image processing apparatus moves from the first region 510 to the second region 520. In the first region 510, the imaging location information may be determined on the basis of the location signals. When the image processing apparatus moves from the first region 510 to the second region 520, it may not be possible to receive location signals. A point where it is not possible to receive location information may be set as a base point 550, and the imaging location information may be determined in consideration of the movement information with respect to the base point 550.

In detail, when no location signals are received, the base point 550 may be set to a time point when a final location signal is received, and the imaging location information may be determined in consideration of the movement information of the imaging processing apparatus moving with respect to the base point 550. For example, when it is assumed that the image processing apparatus moves along the first path 560 and the second path 570 with respect to the base point 550, the imaging location information of the image processing apparatus on the first path 560 may be determined with respect to the base point 550 on the basis of the movement information (a movement direction, a movement speed, a movement distance, a total movement distance, a movement time, etc.) of the image processing apparatus on the first path 560. Also, the imaging location information of the image processing apparatus on the second path 570 may be determined with respect to the base point 550 on the basis of the movement information (a movement direction, a movement speed, a movement distance, a total movement distance, a movement time, etc.) of the image processing apparatus on the second path 570.

In detail, when the image processing apparatus moves along the first path 560, a movement-time-dependent movement distance in a movement direction (east) may be determined, and movement-time-dependent imaging location information may be determined on the basis of the base point according to the movement direction and the movement time-specific movement distance. Likewise, when the image processing apparatus moves along the second path 570, a movement-time-dependent movement distance in a movement direction (east) may be determined, and movement-time-dependent imaging location information with respect to the base point may be determined according to the movement direction and the movement-time-dependent movement distance.

That is, the moving line of the image processing apparatus may be determined on the basis of the base point 550, the movement information of the first path 560, and the movement information of the second path 570. The moving line of the image processing apparatus may be determined on a coordinate plane (e.g., three-dimensional coordinates) using the base point 550 as an origin.

As described above, the imaging location information may be matched to an image (or a frame) captured by the image processing apparatus and may be matched to the user interface (movement) to provide the user provision image. The street view service server may receive the movement information of the first path 560 and the movement information of the second path 570 and provide the user interface (movement) such that a user can move along the first path 560 or the second path 570 in the user provision image.

Also, the street view service server may generate a user provision image by matching the imaged frame to the imaging location information determined based on the movement information on the path. The matching between the frame and the imaging location information based on the movement information will be described in detail below.

In this way, it is possible to provide an indoor image as well as an outdoor image. For example, when the image processing apparatus moves from the outside to an indoor shopping mall, the user interface (movement) may be provided according to movement information related to the indoor shopping mall, and image information related to the indoor shopping mall may also be provided as a user provision image. That is, a user who receives the street view service may also receive images of a specific shopping mall or the inside of a store as street views while he or she is walking on a street. That is, a street view according to an embodiment of the present invention may also include an image of an indoor space connected to a path as well as an image of an external periphery of a path.

The movement information may also include information regarding a movement height. Even when the user is riding an escalator or elevator indoors, the location of the user may be determined using three-dimensional coordinates.

Figure 6:
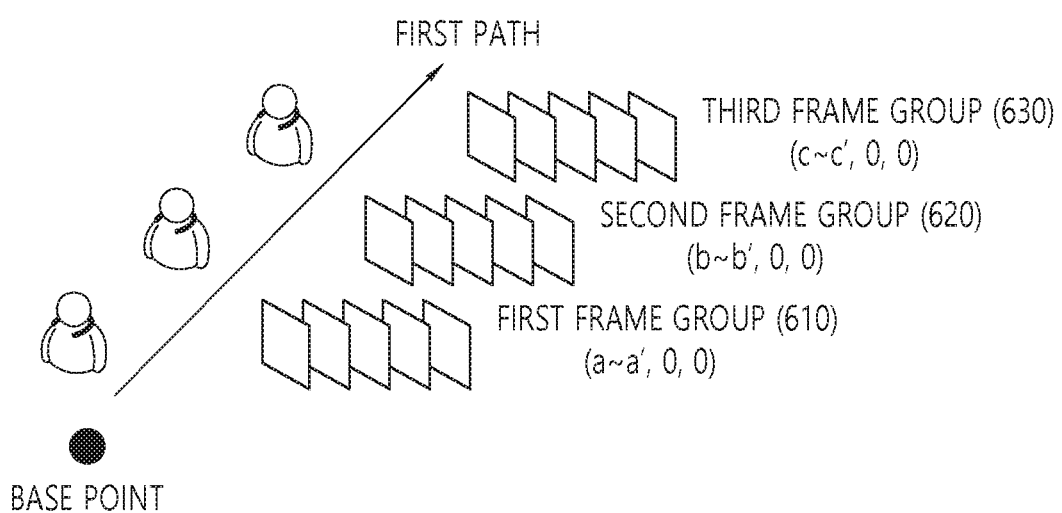
FIG. 6 is a conceptual diagram showing a method of generating a user provision image according to an embodiment of the present invention.

FIG. 6 is a conceptual diagram showing a method of generating a user provision image according to an embodiment of the present invention.

In FIG. 6, there is disclosed a matching method between a frame and imaging location information determined based on movement information.

Referring to FIG. 6, when the movement information is determined as shown in FIG. 5, the imaging location information may be determined on the basis of the movement information. That is, the time-specific imaging location of the image processing apparatus may be determined on the basis of the movement information.

As described above, the movement information may include a time-dependent movement distance, a total movement distance, a movement speed/movement direction, and the like. When it is assumed that the base point is an origin, the imaging location information, which is information regarding the location of the time-dependent image processing apparatus, that is, the time-dependent imaging location of the image processing apparatus, may be determined on the basis of the movement information.

With respect to the base point (0, 0, 0), the image processing apparatus may be located at a point (a~a', 0, 0) in 0 to 1 second, may be located at a point (b~Pb', 0, 0) in 1 to 2 seconds, and may be located at a point (c~Pc', 0, 0) in 2 to 3 seconds. Information regarding the location of the image processing apparatus may be determined as the imaging location information. For convenience of description, the imaging location information is set in units of seconds. However, the imaging location information may be determined in various units rather than in units of seconds.

It is assumed that imaging is performed at 30 fps by the image processing apparatus. A first frame group 610 including 30 frames imaged in 0 to 1 second may correspond to the imaging location information (a~a', 0, 0). A second frame group 620 including 30 frames imaged in 1 to 2 seconds may correspond to the imaging location information (b~b', 0, 0). A third frame group 630 including 30 frames imaged in 2 to 3 seconds may correspond to the imaging location information (c~Pc', 0, 0).

The image processing apparatus may perform imaging according to a movement time to generate time-dependent frame information. The imaging location information may be matched to the frame information by matching (time and imaging location information) to (time and frame information) on the basis of synchronized time information. The street view service server may generate a user provision image by matching the imaging location information to the frame information on the basis of the synchronized time information.

Figure 7:
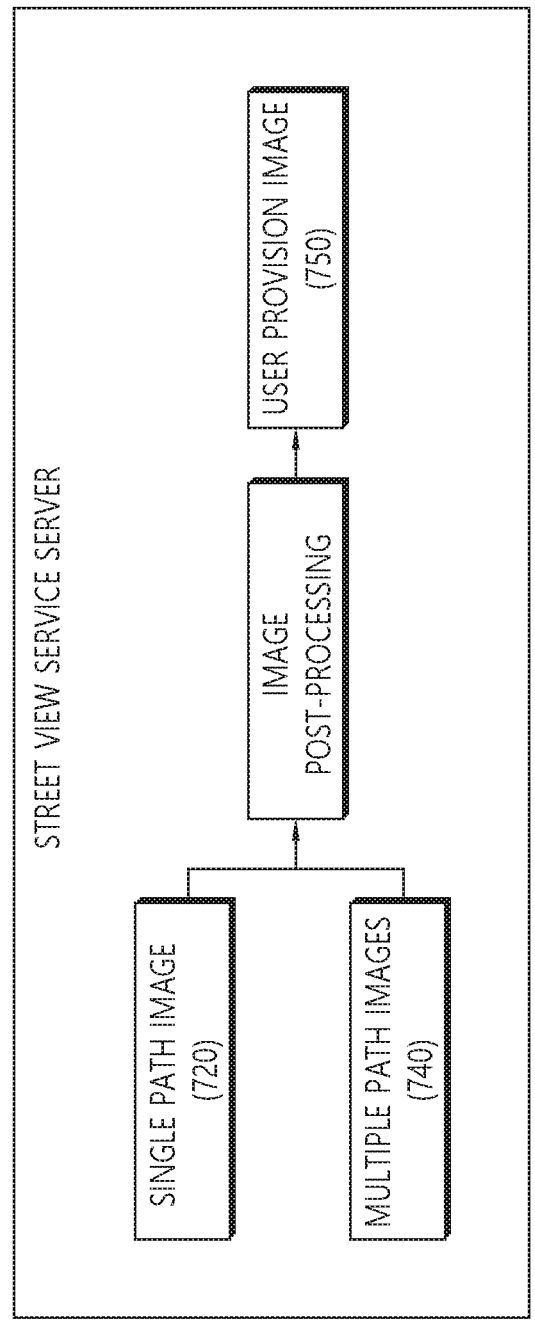
FIG. 7 is a conceptual diagram showing a user provision image generation method according to an embodiment of the present invention.

FIG. 7 is a conceptual diagram showing a user provision image generation method according to an embodiment of the present invention.

In FIG. 7, there is disclosed a method of generating a user provision image through image post-processing for path image information.

The street view service according to an embodiment of the present invention may be provided based on path images captured by a plurality of users using image processing apparatuses in a direct manner. For example, the image processing apparatus may be a wearable apparatus, and a plurality of users who wear such image processing apparatuses may move along a specific path, and the image processing apparatuses may generate path images of the periphery of the path.

When only one path image 720 for the specific path exists, the street view service server may generate a user provision image 750 for the path through image post-processing for the path image 720 (e.g., one omnidirectional image). The street view service server may analyze the path image 720, remove an unnecessary frame from the path image 720, and generate the user provision image 750. Also, in order to generate the user provision image 750, the street view service server may perform post-processing on the path image and generate control information.

When a plurality of path images 740 (e.g., a plurality of omnidirectional images) received from the plurality of image processing apparatuses exist in regards to the same path, the street view service server may generate a user provision image 750 for the path through image post-processing for the plurality of path images 740. The street view service server may analyze the plurality of path images 740, determine at least one selected path image for generating the user provision image 750 from among the plurality of path images 740, and remove an unnecessary frame from the selected path image. Also, in order to generate the user provision image 750, the street view service server may perform post-processing on the selected path image and generate control information. In detail, the street view service server may perform post-processing on the path image so that the user can feel as if he or she is moving along an actual path with respect to the path image.

Figure 8:
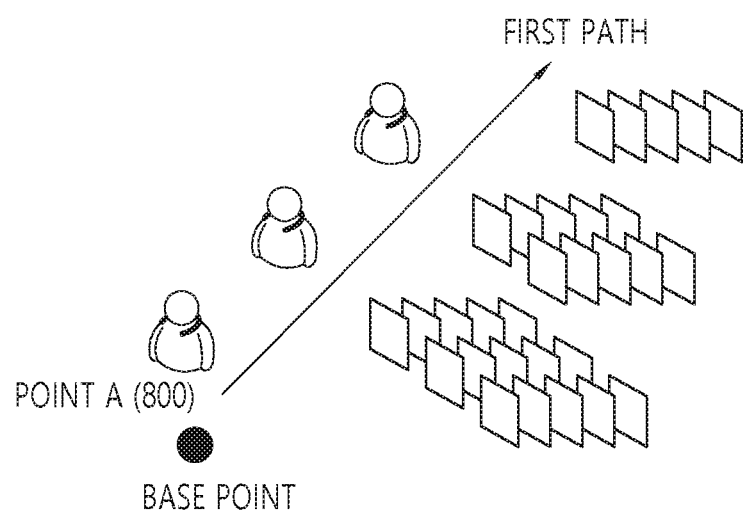
FIG. 8 is a conceptual diagram showing a user provision image generation method according to an embodiment of the present invention.

FIG. 8 is a conceptual diagram showing a user provision image generation method according to an embodiment of the present invention.

In FIG. 8, there is disclosed a method of generating a user provision image for a path through image post-processing for a path image. In particular, there is disclosed a method of removing an unnecessary frame to generate a user provision image.

Referring to FIG. 8, the path image may be an image captured by a user wearing a wearable image processing apparatus.

The street view service server may delete an unnecessary frame among a plurality of frames included in the path image (or a selected path image) in order to provide a user provision image.

When the image processing apparatus continuously stays at a specific location, the image processing apparatus may image the same area, and the imaging of the same area may cause unnecessary frames to be generated. For example, when the image processing apparatuses stops at point A 800 and stays for two seconds, frames obtained by imaging the same object for two seconds may be generated.

In order to generate the user provision image, there is a need to remove unnecessary frames among the frames imaged at point A 800.

The service server may remove the remaining frames excluding frames necessary to generate the user provision image among the frames generated through imaging at point A 800.

For example, when 120 frames are imaged for two seconds at point A 800, 90 frames excluding 30 frames out of 120 frames may be determined as unnecessary frames and removed by the service server.

Figure 9:
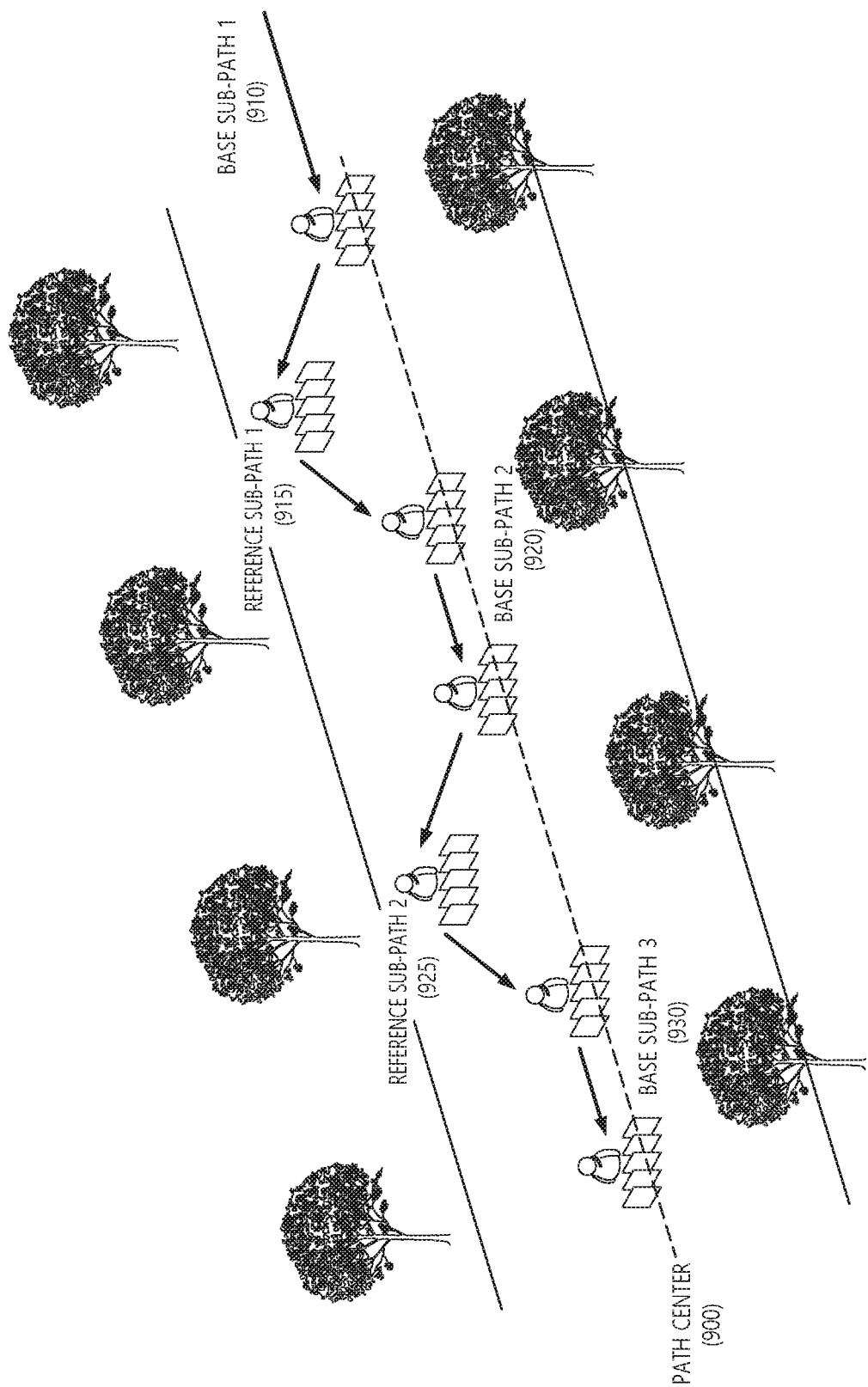
FIG. 9 is a conceptual diagram showing a user provision image generation method according to an embodiment of the present invention.

FIG. 9 is a conceptual diagram showing a user provision image generation method according to an embodiment of the present invention.

In FIG. 9, there is disclosed a method of generating a user provision image for a path through image post-processing for one path image (e.g., one omnidirectional image).

Referring to FIG. 9, the street view service server may analyze a user's path and perform post-processing on a path image.

The street view service server may perform an analysis on a path image captured by the image processing apparatus. It may be assumed that the image processing apparatus is moving along a first path. The image processing apparatus may be a wearable apparatus and may be worn by a user. The image processing apparatus may generate a path image while moving away from the center of the first path rather than moving along the center of the first path.

Accordingly, there is a need for post-processing on the path image in order to provide a path center image, which is an image captured along a path center 900, to a user who receives the street view service. The path center image may provide a user provision image (or a street view image) based on a certain movement direction (or movement path) to the user who receives the street view service.

That is, even when the image processing apparatus does not move along the path center 900 of the first path, the street view service server may generate the path center image on the basis of image post-processing for the captured path image. The street view service server may provide the path center image to the user when providing the street view service, and the user interface (movement) may be positioned in the path center image to receive a user signal.

In order to generate the path center image on the basis of the image post-processing for the path image, the street view service server may determine a base path image from among path images. The base path image is an image captured within a threshold range with respect to the path center and may be an image utilized as a criterion for generating a path center image. The path images except the base path images may be expressed using the term "reference path images." The street view service server may generate a path center image on the basis of a base path image. In this case, the street view service server may refer to a reference path image.

The street view service server may set a path center on the basis of information regarding a path included in a path image. Image information regarding a path along which a user is passing may be included in the path image, and the street view service server may set the path center 900 on the basis of the image information for the path. When the path along which the user is passing has a width of five meters, an area within a threshold distance with respect to the center of the width may be set as the path center 900. That is, the street view service server may determine the center of a path along which the user can pass in the path image and may set an area within a threshold distance with respect to the center of the path as the path center 900.

The street view service server may perform learning to determine the path center 900. The street view service server may receive information including various paths and information regarding the center points of the various paths and may acquire a criterion for determining the path center 900 through machine learning.

The street view service server may determine a path image captured at the path center 900 as a base path image and may determine a path image captured outside the path center 900 as a reference path image. The street view service server may generate a user provision image on the basis of a base path image at a location where the base path image is captured. On the contrary, the street view service server may generate a user provision image on the basis of a base path image and a reference path image at a location where the reference path image is captured.

The first path may be divided into at least one sub-path in consideration of whether the path image is captured at the path center. The first path may be classified into a base sub-path where a base path image is captured and a reference sub-path where a reference path image is captured. The first path may be divided into sub-paths such as base sub-path #1 910, reference sub-path #1 915, base sub-path #2 920, reference sub-path #2 925, and base sub-path #3 930. Base path image #1 may be captured in base sub-path #1 910, base path image #2 may be captured in base sub-path #2 920, and base path image #3 may be captured in base sub-path #3 930. Reference path image #1 may be captured in reference sub-path #1 915, and reference path image #2 may be captured in reference sub-path #2 925.

A specific method for generating a user provision image on the basis of a base sub-path and a reference sub-path is disclosed.

Figure 10:
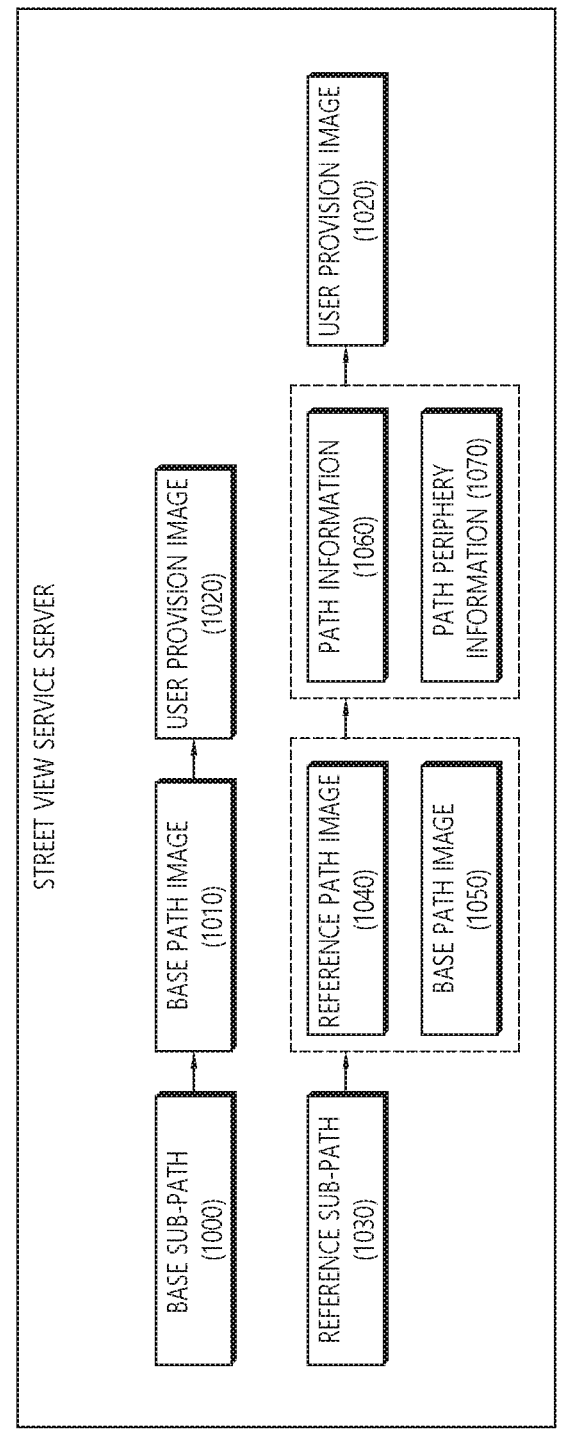
FIG. 10 is a conceptual diagram showing a user provision image generation method according to an embodiment of the present invention.

FIG. 10 is a conceptual diagram showing a user provision image generation method according to an embodiment of the present invention.

In FIG. 10, there is disclosed a method of generating a user provision image for a path through image post-processing for one path image (e.g., one omnidirectional image).

Referring to FIG. 10, in a base sub-path 1000 (e.g., base sub-path #1, base sub-path #2, and base sub-path #3), a user provision image 1020 may be generated on the basis of a base path image 1010 (e.g., base path image #1, base path image #2, and base path image #3). Since the base path image 1010 is an image captured at a path center, the user provision image 1020 may be generated by removing unnecessary frames. The removal of unnecessary frames may be performed before the base path image 1010 and the reference path image 1040 are determined.

In a reference sub-path 1030 (e.g., reference sub-path #1 and reference sub-path #2), a user provision image 1020 may be generated on the basis of a reference path image 1040 (e.g., reference path image #1 and reference path image #2) and/or an adjacent base path image 1010 (e.g., base path image #1, base path image #2, and base path image #3).

When the user provision image is generated without image post-processing for reference path image #1 captured in reference sub-path #1, an image based on a path center cannot be provided to a user. Accordingly, a user provision image 1020 for reference sub-path #1 may be generated through a combination of reference path image #1 and base path image #1 and/or base path image #2 that are captured adjacent to reference path image #1.

In reference sub-path #1, path information 1060 and path periphery information 1070 may be generated on the basis of a combination of reference path image #1 and base path image #1 and/or base path image #2, and a user provision image 1020 may be generated by combining the path information 1060 and the path periphery information 1070. The path information 1060 may be image information regarding a path, and the path periphery information 1070 may be image information regarding the periphery of a path on the basis of the path. The street view service server may determine a part corresponding to a path from a received path image through machine learning on the path and may extract and determine an image corresponding to the path part as the path information 1060. Also, the street view service server may determine the remaining part excluding the path as the path periphery information 1070. The path information 1060 may include a path image and information regarding a location where the path image is generated. The path periphery information 1070 may include a path periphery image and information regarding a location where the path periphery image is generated.

In detail, path information of reference sub-path #1 may be determined on the basis of at least one of path image #1, path image #2, and path image #3. Path image #1 may include image information regarding the path of reference sub-path #1 included in base path image #1 captured at a point where base sub-path #1 meets reference sub-path #1. Path image #2 may include image information regarding the path of reference sub-path #1 included in reference path image #1. Path image #3 may include image information regarding the path of reference sub-path #1 included in base path image #2 captured at a point where reference sub-path #1 meets base sub-path #2.

The street view service server may determine path information of reference sub-path #1 through interpolation/prediction on the basis of at least one of path image #1, path image #2, and path image #3. When the path image is an image biased to the left or right from the path center, an interpolated/predicted path image may be generated as the path information 1060 through image interpolation/prediction on the assumption that the image processing apparatus is located at the path center. For example, the image processing apparatus may generate a reference path image while moving to the left from the path center. In this case, the reference path image may be interpolated by predicting the imaging range of the image processing apparatus when the image processing apparatus is located at the path center. The image processing apparatus may capture an omnidirectional image. When an imaging center point of the omnidirectional image is moved to the path center, the street view service server may predict a change in an image of a part corresponding to the path, interpolate the image, and generate the path information 1060. The change in the image may be a change in a path image captured for each imaging location.

Also, path periphery information 1070 of reference sub-path #1 may be determined on the basis of at least one of path periphery image #1, path periphery image #2, and path periphery image #3. Path periphery image #1 may include image information regarding the path periphery of reference sub-path #1 included in base path image #1 captured at a point where base sub-path #1 meets reference sub-path #1. Path periphery image #2 may include image information regarding the path periphery of reference sub-path #1 included in reference path image #1. Path periphery image #3 may include image information regarding the path periphery of reference sub-path #1 included in base path image #2 captured at a point where reference sub-path #1 meets base sub-path #2.

The street view service server may determine the path periphery information 1070 of reference sub-path #1 through interpolation/prediction on the basis of at least one of path periphery image #1, path periphery image #2, and path periphery image #3. When the path periphery image is an image biased to the left or right from the path center, an interpolated/predicted path periphery image may be generated as the path periphery information 1070 through image interpolation/prediction on the assumption that the image processing apparatus is located at the path center. For example, the image processing apparatus may generate a reference path image while moving to the left from the path center. In this case, the reference path image may be interpolated by predicting the imaging range of the image processing apparatus when the image processing apparatus is located at the path center. The image processing apparatus may capture an omnidirectional image. When an imaging center point of the omnidirectional image is moved to the path center, the street view service server may predict a change in an image of a part corresponding to the path periphery, interpolate the image, and generate the path periphery information. The change in the image may be a change in a path periphery image captured for each imaging location.

That is, the street view service server may generate path information 1060 and path periphery information 1070 individually, match the path information 1060 and the path periphery information 1070 on the basis of location information, and provide a user provision image based on a path center even in a reference sub-path.

Figure 11:
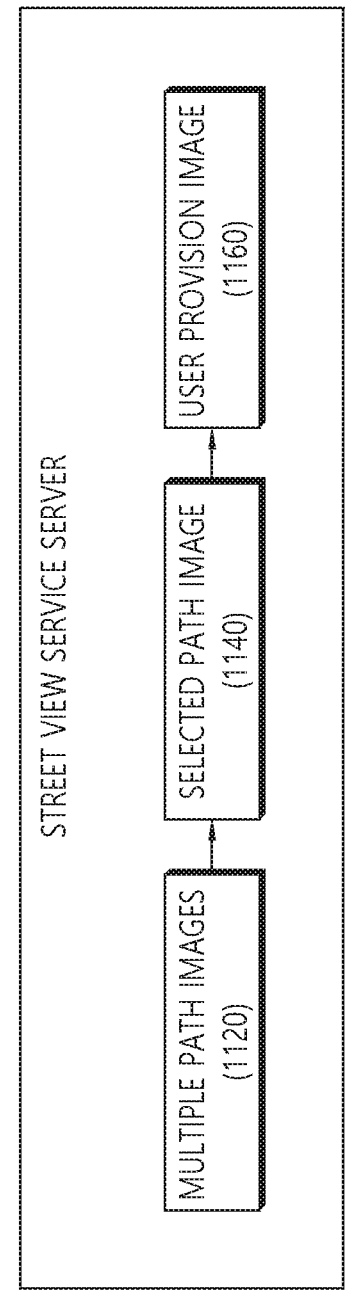
FIG. 11 is a conceptual diagram showing a user provision image generation method according to an embodiment of the present invention.

FIG. 11 is a conceptual diagram showing a user provision image generation method according to an embodiment of the present invention.

In FIG. 11, there is disclosed a method of generating a user provision image for a path through image post-processing for a plurality of path images (e.g., a plurality of omnidirectional images).

Referring to FIG. 11, the street view service server may receive a plurality of path images 1120 of the same path and generate a user provision image through image post-processing for the plurality of path images 1120.

The street view service server may determine at least one path image 1140 selected from among the plurality of path images 1120 to generate the user provision image.

The street view service server may determine the selected path image 1140 by determining a path center and excluding an image spaced a threshold distance or more from the path center or an image that is difficult to use (e.g., an image captured to have a threshold height or less due to a user bending over) to generate the user provision image.

The street view service server may generate a user provision image 1160 on the basis of the selected path image 1140. The user provision image may be generated on the basis of various methods.

The user provision image 1160 may be generated as a combination of a plurality of selected path images 1140.

For example, the path may be divided into a plurality of sub-paths, and a plurality of optimal selected path images 1140 may be determined for the plurality of sub-paths. The plurality of optimal selected path images 1140 may be combined to generate the user provision image 1160. In this case, the plurality of optimal selected path images 1140 may be images captured under similar imaging environments (imaging time, weather upon imaging, intensity of light upon imaging, etc.).

Alternatively, the street view service server may generate path information and path periphery information on the basis of the plurality of selected path images 1140 and may generate a user provision image 1160 by combining the path information and the path periphery information on the basis of location information.

As described above with reference to FIG. 10, the street view service server may extract an image part corresponding to a path from the plurality of selected path images 1140 and generate path information for each location. Also, the street view service server may extract an image part corresponding to a path periphery from the plurality of selected path images 1140 and generate path periphery information for each location.

That is, the street view service server may generate path information and path periphery information on the basis of the plurality of selected path images 1140 individually and may provide a user provision image 1160 based on a path center even in a reference sub-path by matching the path information and the path periphery information on the basis of location information.

The street view service server may continuously receive path image information for a specific path from the image processing apparatus and may continuously update a user provision image on the basis of the received path image information.

Figure 12:
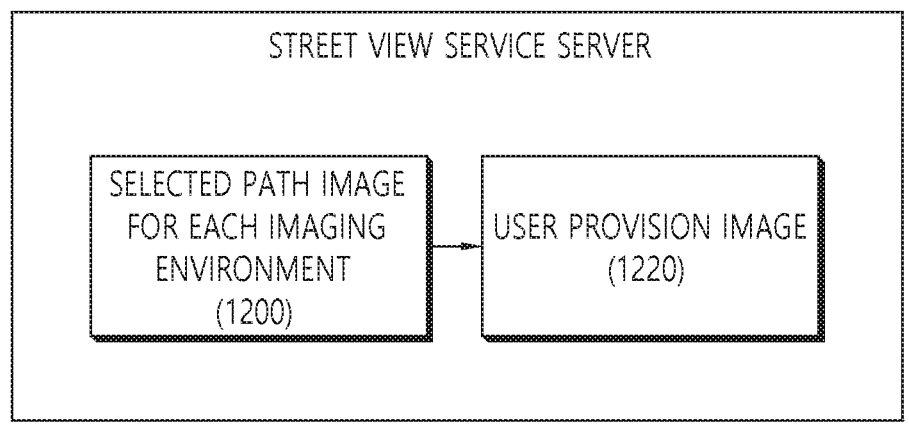
FIG. 12 is a conceptual diagram showing a user provision image generation method according to an embodiment of the present invention.

FIG. 12 is a conceptual diagram showing a user provision image generation method according to an embodiment of the present invention.

In FIG. 12, there is disclosed a method of generating a user provision image for a path through image post-processing for a plurality of path images (e.g., a plurality of omnidirectional images).

Referring to FIG. 12, there is disclosed a method of providing a street view image over time through the street view service.

The street view service server may provide a user provision image 1220 by combining selected path images 1200 by time zone (or imaging environment). For example, a morning street view of a corresponding path obtained by combining selected path images captured in the morning may be provided as the user provision image 1220, an afternoon street view obtained by combining selected path images captured in the afternoon may be provided as the user provision image 1220, and a night street view obtained by combining selected path images captured at night may be provided as the user provision image 1220.

A user may receive a street view corresponding to the current time according to the current time as the user provision image 1220 and may receive a street view corresponding to a time point when a separate time point is selected by the user.

The street view service server may generate a street view for each time point by combining selected path images by imaging environment (imaging time point, weather upon imaging, etc.) and may provide the street view as the user provision image 1220.

Figure 13:
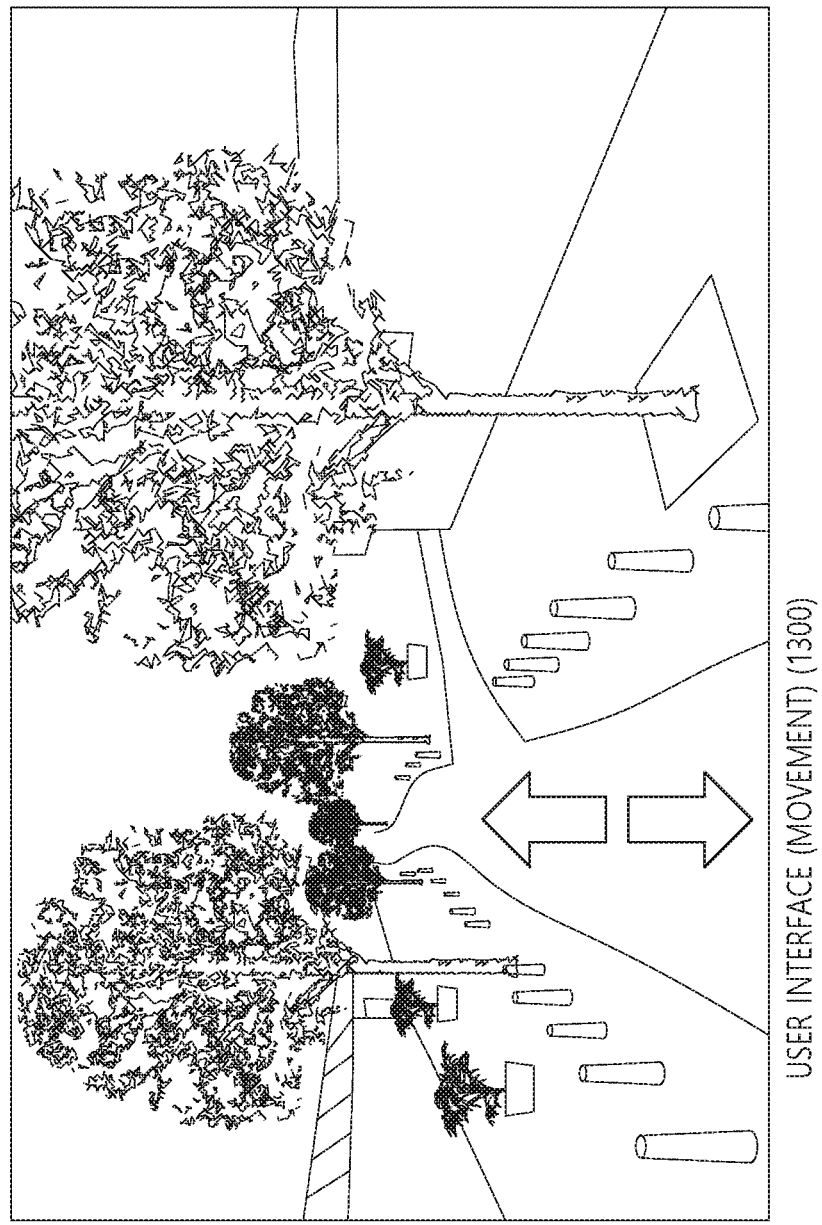
FIG. 13 is a conceptual diagram showing a street view service method according to an embodiment of the present invention.

FIG. 13 is a conceptual diagram showing a street view service method according to an embodiment of the present invention.

In FIG. 13, there is disclosed a method of a street view service server generating control information and providing a street view service for each path.

A location-dependent user provision image may be matched to map information including conventional path information, and the street view service server may receive a street view provision request for a specific location from a user apparatus on the basis of the map information and may provide a user provision image (or a street view image) corresponding to the street view provision request to the user apparatus.

The street view service server may provide control information, and the user apparatus may output a user interface (movement) 1300 on the basis of the control information and may provide a user provision image according to a user signal input to the user interface (movement) 1300. In detail, in the case of a path having movement directions (south and north), the user interface (movement) 1300 may be a user interface for receiving an input of which one of the movement directions (south and north) is selected.

Also, the user interface (movement) 1300 may be generated in consideration of an imaged area. When the path has possible movement directions (east, west, south, and north) and the user provision image is provided for only east, west, and south, a user interface (movement) 1300 that allows movement in east, west, and south other than in north may be provided.

The street view service server may determine a movable branch point and may determine whether a user provision image for each path exists for a path along which a user can move at the branch point to generate the user interface (movement) 1300.

Figure 14:
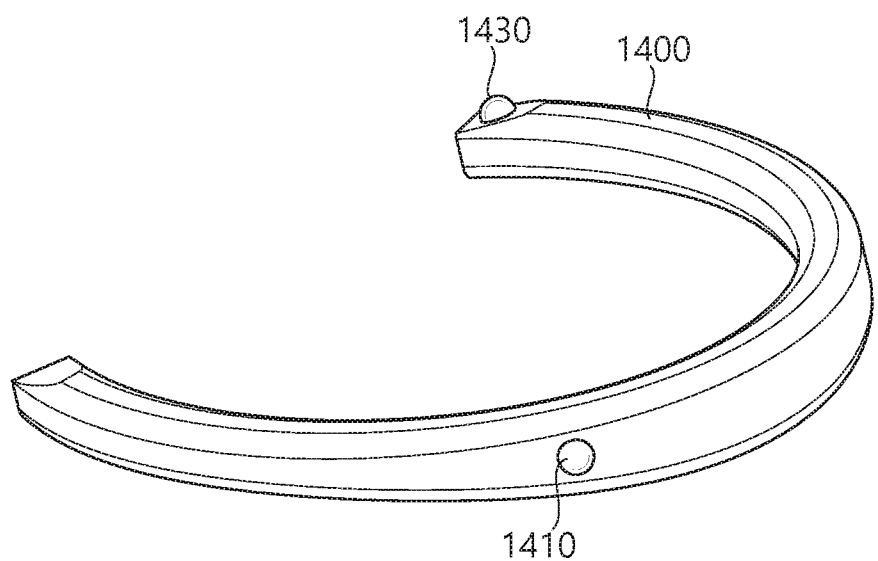
FIG. 14 is a schematic view illustrating an omnidirectional image processing apparatus according to an exemplary embodiment of the present inventive concept.
Figure 14:
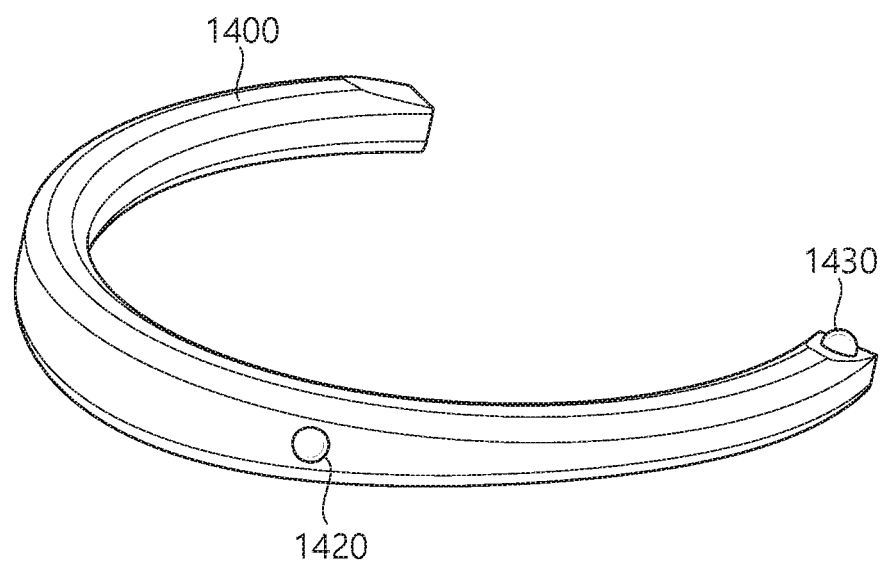
Figure 15:
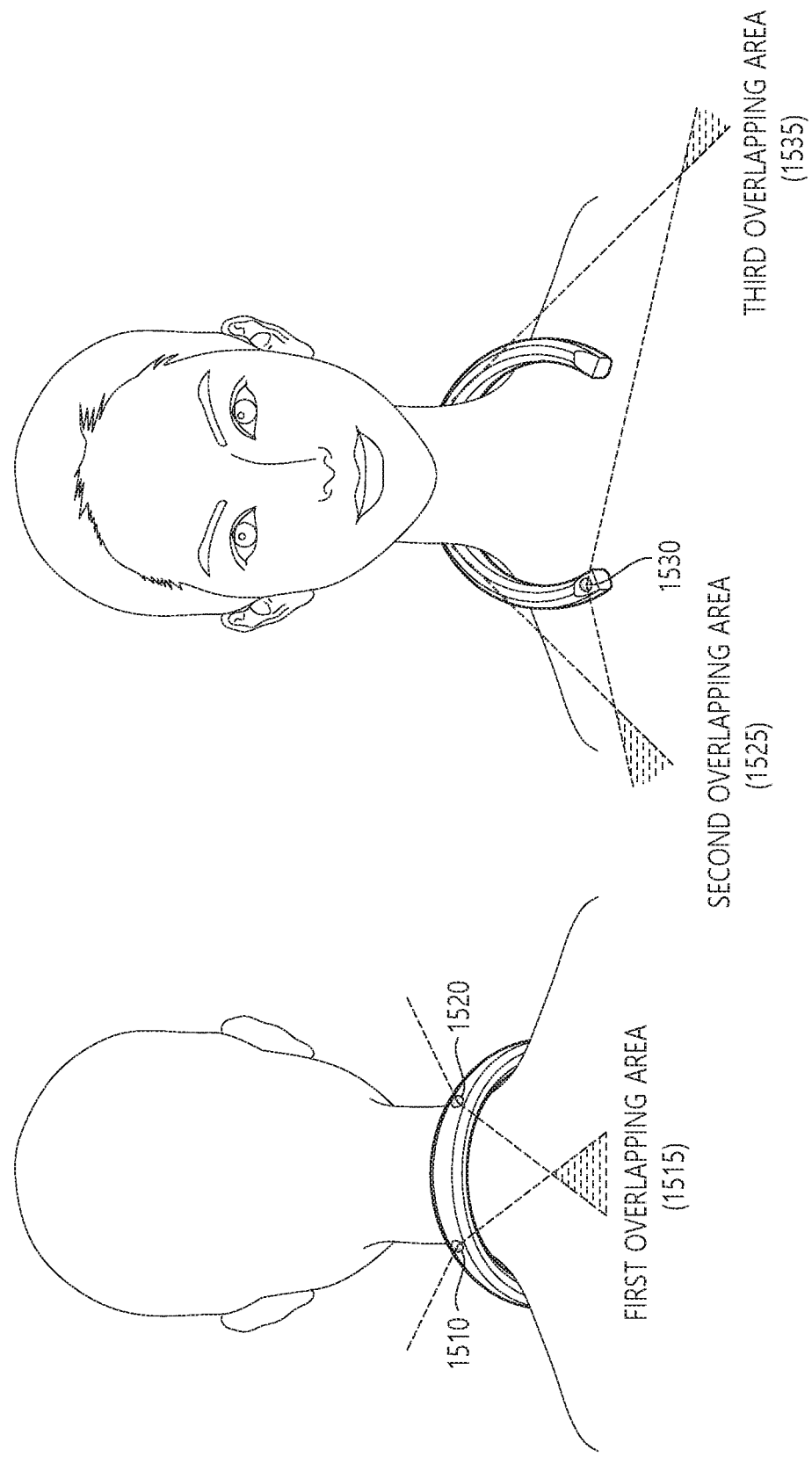
FIG. 15 is a schematic view showing the characteristics of a plurality of image capturing units provided in the omnidirectional image processing apparatus according to an exemplary embodiment of the present inventive concept.
Figure 16:
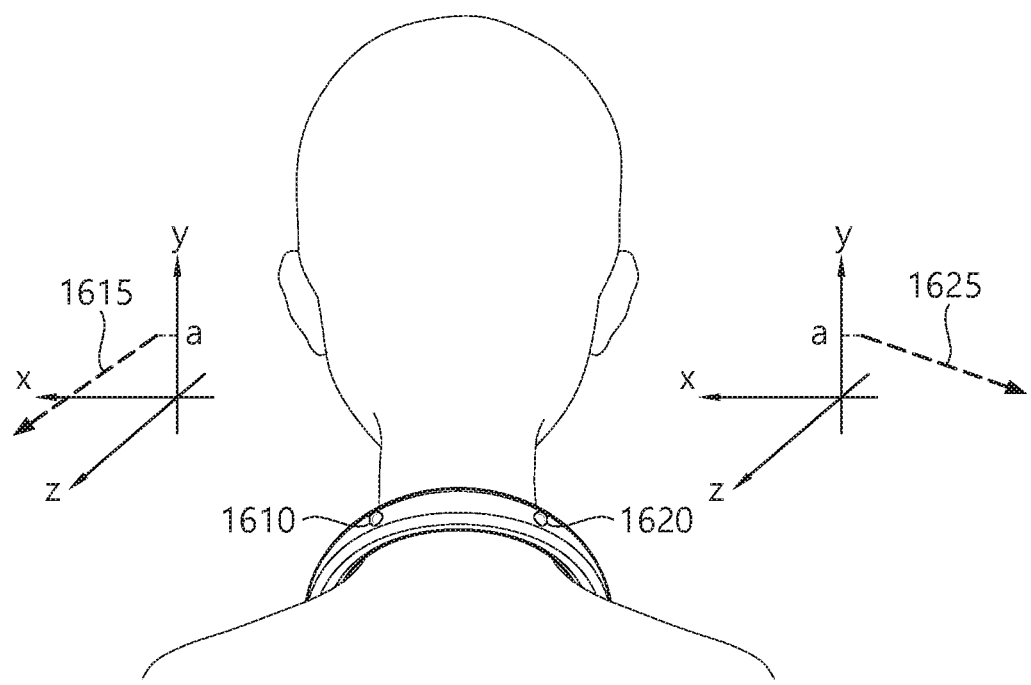
FIG. 16 is a schematic view illustrating image capturing lines of a plurality of image capturing units according to an exemplary embodiment of the present inventive concept.
Figure 16:
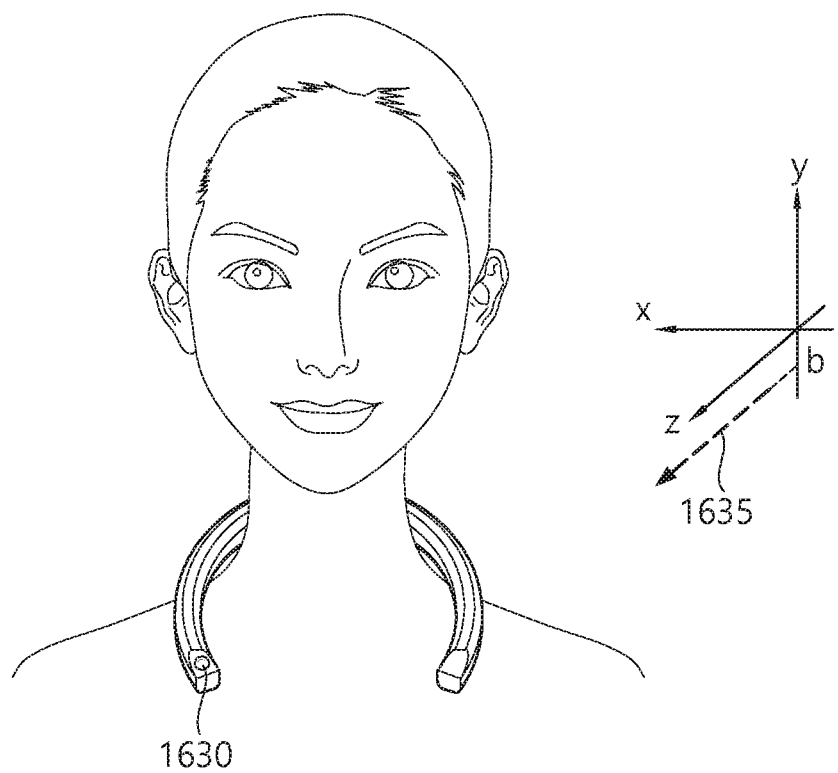

Hereinafter, FIGS. 14 to 16 are examples of the image processing apparatuses disclosed in FIGS. 1 to 13. The street view service according to an embodiment of the present invention may be performed by various other image processing apparatuses, and such embodiments are also within the scope of the present invention.

FIG. 14 is a schematic view illustrating an omnidirectional image processing apparatus according to an exemplary embodiment of the present inventive concept.

The structure of the omnidirectional image processing apparatus according to an exemplary embodiment of the present inventive concept is as illustrated in FIG. 14.

Referring to FIG. 14, an omnidirectional image processing apparatus 1400 may have a wearable structure and may have a necklace-like shape that can be worn around the neck of a user. The omnidirectional image processing apparatus 1400 may be in the shape of an open necklace that is open on one side thereof, as illustrated in FIG. 14, or in the shape of a non-open necklace. In the description that follows, it is assumed that the omnidirectional image processing apparatus 1400 has a U shape that is open on one side thereof. The omnidirectional image processing apparatus 1400, which is U-shaped, may be worn around the neck of the user as a wearable device and may be able to capture an omnidirectional image.

For convenience, it is assumed that the omnidirectional image processing apparatus 1400 is worn around the neck of the user in the shape of a necklace (or in the shape of an open necklace that is open on one side thereof or in a U shape). However, the omnidirectional image processing apparatus 1400 may not necessarily be worn around the neck of the user. For example, the omnidirectional image processing apparatus 1400 may acquire an omnidirectional image by being hung on/attached to other parts of the body of the user or an external object.

The user can wear the omnidirectional image processing apparatus 1400 around his or her neck and can thus acquire a plurality of images for generating an omnidirectional image with both hands free.

The omnidirectional image processing apparatus 1400 may include a plurality of image capturing units. The plurality of image capturing units may be provided in the omnidirectional image processing apparatus 1400 to be a particular distance (or a predetermined distance) apart from one another and may independently capture images in accordance with a predetermined field of view/image capturing line. The locations of the plurality of image capturing units may be fixed in the omnidirectional image processing apparatus 1400, or the plurality of image capturing units may be movable so that their locations may vary.

For example, the omnidirectional image processing apparatus 1400 may include three image capturing units, and the three image capturing units may capture an omnidirectional image with a predetermined field of view (e.g., 120 degrees to 180 degrees). The three image capturing units may be first, second, and third image capturing units 1410, 1420, and 1430.

For convenience, an omnidirectional image processing apparatus 1400 including three image capturing units will be described below. However, the omnidirectional image processing apparatus 1400 may be modified to include a plurality of image capturing units other than three (e.g., two, four, five, or six image capturing units) to capture an omnidirectional image, without departing from the spirit and scope of the present inventive concept.

The first, second, and third image capturing units 1410, 1420, and 1430 may capture an image in accordance with a predetermined field of view. At given time resources, a first image may be generated by the first image capturing unit 1410, a second image may be generated by the second image capturing unit 1420, and a third image may be generated by the third image capturing unit 1430. The first, second, and third image capturing units 1410, 1420, and 1430 may have a field of view of 120 degrees or greater, and there may exist overlapping areas between the first, second, and third images. Thereafter, an omnidirectional image may be generated by stitching together and/or correcting the first, second, and third images, which are captured at the given time resources by the omnidirectional image processing apparatus 1400. The stitching and/or the correcting of a plurality of images may be performed by the omnidirectional image processing apparatus or may be performed by a user device (such as a smartphone) that can communicate with the omnidirectional image processing apparatus 1400. That is, additional image processing for a plurality of images generated may be performed by the omnidirectional image processing apparatus 1400 and/or another image processing apparatus (such as a smartphone, a personal computer (PC), or the like).

The characteristics of the omnidirectional image processing apparatus and an omnidirectional image generation method will hereinafter be described.

FIG. 15 is a schematic view showing the characteristics of a plurality of image capturing units provided in the omnidirectional image processing apparatus according to an exemplary embodiment of the present inventive concept.

FIG. 15 shows the characteristics of a plurality of image capturing units provided in a U-shaped omnidirectional image processing apparatus. The locations of the plurality of image capturing units illustrated in FIG. 15 are merely exemplary. The plurality of image capturing units may be disposed at various locations in the omnidirectional image processing apparatus to capture a plurality of images for generating an omnidirectional image.

The rear of the omnidirectional image processing apparatus is as illustrated in the upper part of FIG. 15.

First and second image capturing units 1510 and 1520, which are included in the omnidirectional image processing apparatus, may be located at a curved part of the omnidirectional image processing apparatus where curvature is present. Specifically, when a user wears the omnidirectional image processing apparatus around his or her neck as a wearable device, the first and second image capturing units 1510 and 1520 may be provided at the curved part of the omnidirectional image processing apparatus that is in contact with the back of the neck of the user. For example, the first and second image capturing units 1510 and 1520 may be a predetermined distance apart from a point on the U-shaped omnidirectional image processing apparatus with a maximum curvature (e.g., the middle part of the U-shaped omnidirectional image processing apparatus).

The first image capturing unit 1510 may capture an image of a region including a rear left blind spot with respect to the user's line of sight. The second image capturing unit 1520 may capture an image of a region including a rear right blind spot with respect to the user's line of sight. Specifically, the first image capturing unit 1510 may have a first field of view and may capture an image of a region corresponding to the first field of view. The second image capturing unit 1520 may have a second field of view and may capture an image of a region corresponding to the second field of view. For example, the first and second fields of view may be 120 degrees to 180 degrees.

When image capturing is performed by the first and second image capturing units 1510 and 1520, a first overlapping area 1515, which is the overlapping area of the first and second fields of view, may be generated. Thereafter, an omnidirectional image may be generated through image stitching in consideration of the overlapping area.

The front of the omnidirectional image processing apparatus is as illustrated in the lower part of FIG. 15.

A third image capturing unit 1530 may be disposed at the front of the omnidirectional image processing apparatus. Specifically, the third image capturing unit 1530 may be disposed at an end portion of the omnidirectional image processing apparatus (i.e., at an end portion of the U-shaped omnidirectional image processing apparatus). When a user wears the omnidirectional image processing apparatus around his or her neck as a wearable device, the end portion of the U-shaped omnidirectional image processing apparatus may face forward (i.e., toward the direction of the user's line of sight). The omnidirectional image processing apparatus includes first and second end portions, and the third image capturing unit 1530 may be disposed at one of the first and second end portions.

The third image capturing unit 1530 may perform image capturing in the same direction as the user's line of sight to capture an image of a region corresponding to the user's line of sight.

Specifically, the third image capturing unit 1530 may have a third field of view and may capture an image of a region corresponding to the third field of view. For example, the third field of view may be 120 degrees to 180 degrees. When image capturing is performed by the third image capturing unit 1530, a second overlapping area 1525, which is the overlapping area of the first field of view of the first image capturing unit 1510 and the third field of view of the third image capturing unit 1530, may be generated. Also, when image capturing is performed by the third image capturing unit 1530, a third overlapping area 1535, which is the overlapping area of the second field of view of the second image capturing unit 1520 and the third field of view of the third image capturing unit 1530, may be generated.

Due to the structural characteristics of the omnidirectional image processing apparatus as a wearable device that can be worn around the neck of a user, the first and second image capturing units 1510 and 1520 may be positioned higher than the third image capturing unit 1530 on the basis of the ground. Also, the third image capturing unit 1530 may be disposed at only one end portion of the omnidirectional image processing apparatus.

In an existing omnidirectional image processing apparatus, a plurality of image capturing units may be configured to be disposed at the same height and a predetermined angle, but in the omnidirectional image processing apparatus according to an exemplary embodiment of the present inventive concept, a plurality of image capturing units may be configured to have different angles with respect to each other and to be disposed at different heights. Thus, the first, second, and third overlapping areas 1515, 1525, and 1535, which are generated by a plurality of images captured by the plurality of image capturing units of the omnidirectional image processing apparatus according to an exemplary embodiment of the present inventive concept, may have different sizes and/or different shapes.

Thereafter, an omnidirectional image may be generated by performing image processing (such as image stitching/correction) on the first, second, and third images each generated by the first, second, and third image capturing units 1510, 1520, and 1530 in consideration of the first, second, and third overlapping areas 1515, 1525, and 1535.

The first, second, and third fields of view may be set to be the same, or to differ from one another, without departing from the spirit and scope of the present inventive concept.

FIG. 16 is a schematic view illustrating image capturing lines of a plurality of image capturing units according to an exemplary embodiment of the present inventive concept.

FIG. 16 illustrates image capturing lines of a plurality of image capturing units installed in an omnidirectional image processing apparatus according to an exemplary embodiment of the present inventive concept. Assuming that the ground is parallel to the X-Z plane formed by the X axis and the Z axis, the plurality of image capturing lines may be defined as lines vertically penetrating the centers of the lenses of the plurality of image capturing units included in the omnidirectional image processing apparatus according to an exemplary embodiment of the present inventive concept in a space defined by the X axis, the Y axis, and the Z axis.

In an existing omnidirectional image processing apparatus, a plurality of image capturing units may be implemented at the same height at a predetermined angle (for example, 120 degrees). In this case, a plurality of image capturing lines of the plurality of image capturing units included in the existing omnidirectional image processing apparatus may be a plurality of lines extending in parallel to the ground (or the X-Z plane) and having a predetermined angle (for example, 120 degrees) with respect to one another.

As already described above, in the omnidirectional image processing apparatus according to an exemplary embodiment of the present inventive concept, the plurality of image capturing units may have different heights (or locations) and different angles with respect to one another (or the image capturing lines of the plurality of image capturing units have different angles with respect to one another) during image capturing. Thus, the properties of the image capturing lines of the omnidirectional image processing apparatus according to an exemplary embodiment of the present inventive concept differ from the properties of the image capturing lines of the existing omnidirectional image processing apparatus.

The image capturing lines of the plurality of image capturing units, illustrated in FIG. 16, are exemplary for showing differences in properties (for example, in height and angle) between the image capturing lines of the plurality of image capturing units, resulting from the characteristics of a wearable device. Also, the image capturing lines of FIG. 16 may be image capturing lines when a user who wears the omnidirectional image processing apparatus according to an exemplary embodiment of the present inventive concept does not move or the omnidirectional image processing apparatus according to an exemplary embodiment of the present inventive concept is fixed in a particular state.

The upper part of FIG. 16 illustrates image capturing lines of first and second image capturing units 1610 and 1620.

The first and second image capturing units 1610 and 1620 may be positioned relatively higher than a third image capturing unit 1630. Assuming that a user who wears the omnidirectional image capturing apparatus around is standing in a Y-axis direction, due to the structural characteristics of a wearable device that can be worn on the neck, a part of the omnidirectional image capturing apparatus with curvature (i.e., a curved/central part of a U shape) where the first and second image capturing units 1610 and 1620 are disposed may be relatively raised, and a leg part of the omnidirectional image capturing apparatus (i.e., an end part of the U shape) where the third image capturing unit 1630 is disposed may be relatively dropped.

For example, a first image capturing line 1615 of the first image capturing line 1610 may be parallel to the X-Z plane and may have a first angle, a second angle, and a a third angle with respect to the X axis, the Y axis, and the Z axis, respectively, at a point "a" on the Y axis.

A second image capturing line 1625 of the second image capturing unit 1620 may be parallel to the X-Z plane and may have a fourth angle, a fifth angle, and a sixth angle with respect to the X axis, the Y axis, and the Z axis, respectively, at the point "a" on the Y axis.

Referring to the lower part of FIG. 16, a third image capturing line 1635 of the third image capturing unit 1630 may be parallel to the X-Z plane and may have a seventh angle, an eighth angle, and a ninth angle with respect to the X axis, the Y axis, and the Z axis, respectively, at a point "b" on the Y axis. Here, b may be a smaller value than a. The third image capturing line 1635 of the third image capturing unit 1630 may be parallel to the X-Z plane and may face forward like the user's line of sight (for example, toward a direction perpendicular to the X-Y plane).

That is, the first and second image capturing lines 1615 and 1625 may have the same height with respect to the Y axis, and the third image capturing line 1635 may be positioned relatively lower than the first and second image capturing lines with respect to the Y axis. The first, second, and third image capturing lines 1615, 1625, and 1635 illustrated in FIG. 16 are exemplary image capturing lines having different properties, and various image capturing lines other than those set forth herein can be defined to capture an omnidirectional image.

Figure 17:
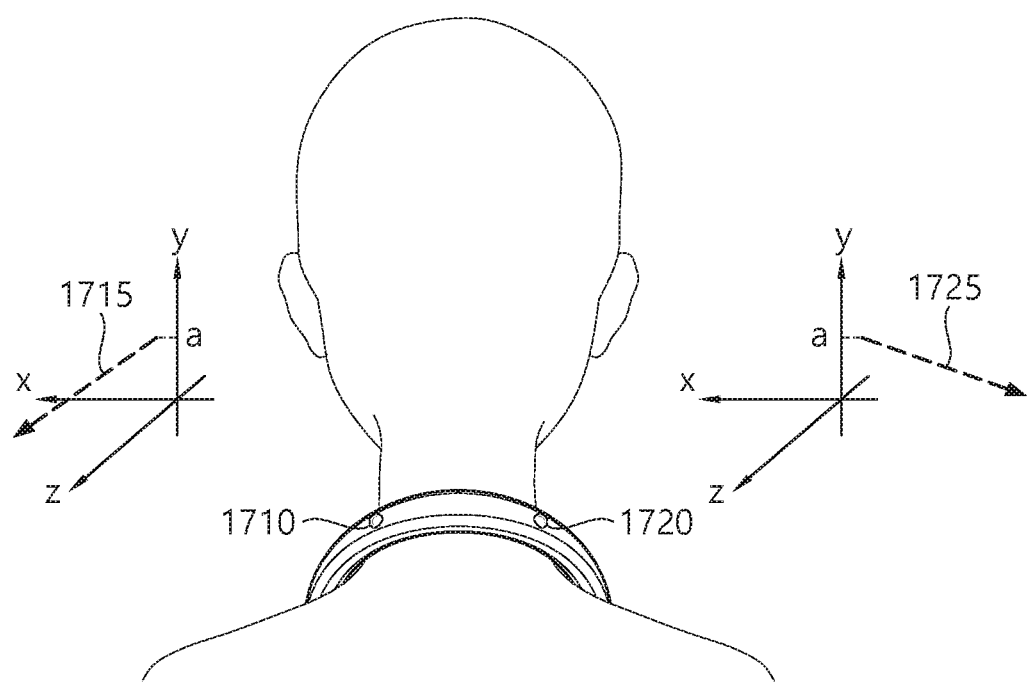
FIG. 17 is a schematic view illustrating image capturing lines of a plurality of image capturing units according to an exemplary embodiment of the present inventive concept.
Figure 17:
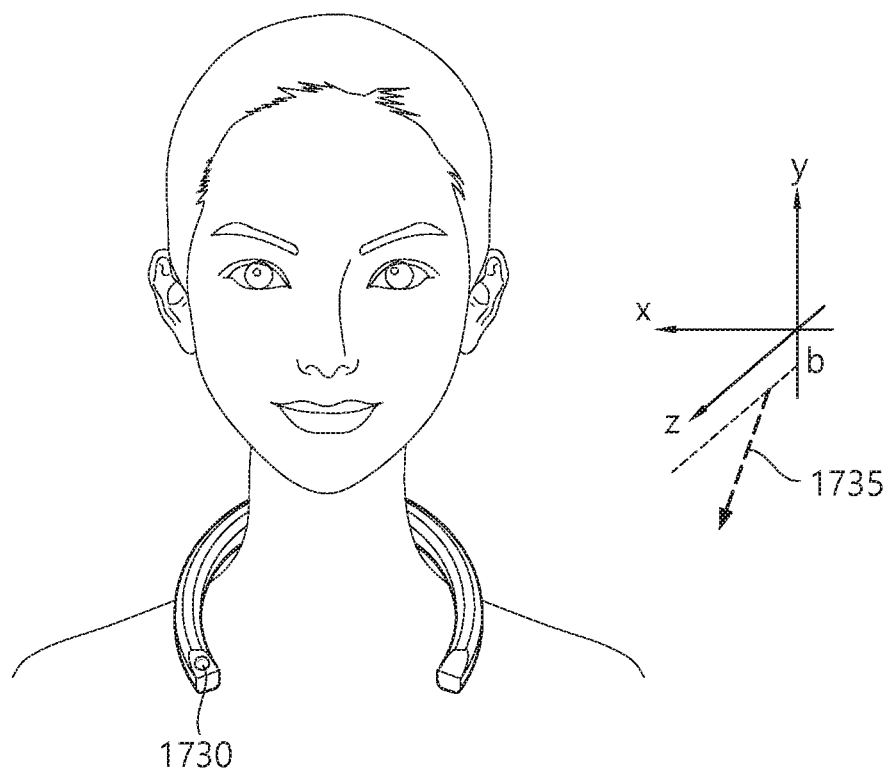

FIG. 17 is a schematic view illustrating image capturing lines of a plurality of image capturing units according to an exemplary embodiment of the present inventive concept.

FIG. 17 illustrates image capturing lines of a plurality of image capturing units, which are different from those of FIG. 16. It is assumed that the ground is parallel to the X-Z plane formed by the X axis and the Z axis.

The upper part of FIG. 17 illustrates image capturing lines of first and second image capturing units 1710 and 1720.

The first and second image capturing units 1710 and 1720 may be positioned relatively higher than a third image capturing unit 1730. Assuming that a user is standing in a Y-axis direction, due to the structural characteristics of a wearable device that can be worn around the neck, image capturing may be performed in a state in which a part of the omnidirectional image capturing apparatus with curvature (i.e., a curved part of a U shape) where the first and second image capturing units 1710 and 1720 are disposed is relatively raised and a leg part of the omnidirectional image capturing apparatus (i.e., an end part of the U shape) where the third image capturing unit 1730 is disposed is relatively dropped.

For example, a first image capturing line 1715 of the first image capturing line 1710 may be parallel to the X-Z plane and may have a first angle, a second angle, and a third angle with respect to the X axis, the Y axis, and the Z axis, respectively, at a point "a" on the Y axis.

A second image capturing line 1715 of the second image capturing unit 1720 may be parallel to the X-Z plane and may have a fourth angle, a fifth angle, and a sixth angle with respect to the X axis, the Y axis, and the Z axis at the point "a" on the Y axis.

The lower part of FIG. 17 illustrates an image capturing line of the third image capturing unit 1730.

A third image capturing line 1735 of the third image capturing unit 1730 may be parallel to the X-Z plane and may have a seventh angle, an eighth angle, and a ninth angle with respect to the X axis, the Y axis, and the Z axis, respectively, at a point "b" on the Y axis.

Since the third image capturing unit 1730 is disposed at an end portion of the omnidirectional image processing apparatus, the third image capturing line may not be parallel to the X-Z plane and may have a predetermined angle (for example, 0 to 30 degrees) with respect to the X-Z plane.

That is, the first and second image capturing lines 1715 and 1725 may have the same height with respect to the Y axis, and the third image capturing line 1735 may be positioned relatively lower than the first and second image capturing lines 1715 and 1725 with respect to the Y axis. Also, the first and second image capturing lines 1715 and 1725 may be parallel to the X-Z plane, but the third image capturing line 1735 may not be parallel to the X-Z plane.

In another exemplary embodiment of the present inventive concept, the first image capturing line of the first image capturing unit may form a first' angle with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form the first' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a second' angle with respect to the X-Z plane and may have a seventh angle, an eighth angle, and a ninth angle with respect to the X axis, the Y axis, and the Z axis, respectively, starting from a point "b" on the Y axis.

In yet another exemplary embodiment of the present inventive concept, the first image capturing line of the first image capturing unit may form angle 1' with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form a second' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a third' angle with respect to the X-Z plane and may have a seventh angle, an eighth angle, and a ninth angle with respect to the X axis, the Y axis, and the Z axis, respectively, starting from the point "b" on the Y axis.

That is, in the omnidirectional image processing apparatus according to an exemplary embodiment of the present inventive concept, the image capturing lines of a plurality of image capturing units may be positioned at different points on the Y axis and may have different angles with respect to the ground (or the X-Z plane) unlike in an image processing apparatus where the image capturing lines of a plurality of image capturing units have the same angle with respect to the ground at a given point on the Y axis.

The above-described exemplary embodiments of the present inventive concept may be implemented in the form of a program command that can be performed through various computer components, and may be recorded on a computer-readable storage medium. The computer-readable storage medium may include a program command, a data file, and a data structure individually or a combination thereof. The program command recorded in the computer-readable storage medium may be specially designed and configured for the present inventive concept, or may be known to those skilled in a computer software field to be used. Examples of the computer-readable storage medium include a magnetic medium such as a hard disk, a floppy disk, and a magnetic tape, an optical medium such as a CD-ROM and a DVD, a magneto-optical medium such as a floptical disk, and a hardware device such as a ROM, a RAM, and a flash memory, that are specially configured to store and perform program commands. Examples of the program commands may include a machine code generated by a compiler and a high-level language code that can be executed in a computer using an interpreter. The hardware device may be configured as at least one software-module in order to perform the operations of the present inventive concept, and vice versa.

While the present inventive concept has been described with reference to specific details, such as detailed components, specific embodiments, and drawings, these are only examples to facilitate the overall understanding of the present inventive concept and the present inventive concept is not limited thereto. It will be understood by those skilled in the art that various modifications and changes can be made from the descriptions above.

Therefore, the spirit of the present inventive concept is defined not by the detailed description of the present inventive concept, but by the appended claims, and encompasses all modifications and equivalents that fall within the scope of the appended claims.

The invention claimed is:

1. A street view service method comprising:
   causing a street view service server to receive a first path image of a first path from a first image processing apparatus;
   causing the street view service server to generate first user provision information for a street view service for the first path on the basis of the first path image;
   causing the street view service server to transmit the first user provision information to a user apparatus;
   causing the street view service server to receive a second path image of the first path from a second image processing apparatus;
   causing the street view service server to generate second user provision information for the street view service for the first path on the basis of the first path image and the second path image; and
   causing the street view service server to transmit the second user provision information to the user apparatus.

2. The street view service method of claim 1, wherein,
   the first user provision information includes first user provision image information and first control information,
   the first user provision image information is image information for the street view service generated through image post-processing for the first path image, and
   the first control information is information for controlling the image information through the user apparatus.

3. The street view service method of claim 2, wherein,
   the first image processing apparatus generates an omnidirectional image, and
   the first image processing apparatus is a wearable apparatus.

4. The street view service method of claim 1, wherein,
   the second user provision information includes second user provision image information, and
   the second user provision image information is image information for the street view service generated through image post-processing for the first path image and the second path image.

5. A street view service server for a street view service, the street view service server comprising:
- a communication unit for data communication with a user apparatus; and
- a processor operatively connected to the communication unit, wherein the processor is configured to:
- receive a first path image of a first path from a first image processing apparatus, the first image processing apparatus generating an omnidirectional image, the first image processing apparatus being a wearable apparatus;
- generate first user provision information for a street view service for the first path on the basis of the first path image; and
- transmit the first user provision information to the user apparatus, wherein, the first user provision information includes first user provision image information and first control information, the first user provision image information is image information for the street view service generated through image post-processing for the first path image, and the first control information is information for controlling the image information through the user apparatus, wherein the processor is configured to:
- receive a second path image of the first path from a second image processing apparatus;
- generate second user provision information for the street view service for the first path on the basis of the first path image and the second path image; and
- transmit the second user provision information to the user apparatus.

6. The street view service server of claim 5, wherein, the second user provision information includes second user provision image information, and the second user provision image information is image information for the street view service generated through image post-processing for the first path image and the second path image.

7. The street view service server of claim 5, wherein the omnidirectional image is based on a video captured along a specific path.

* * * * *